(12) United States Patent
Julia et al.

(10) Patent No.: US 8,787,164 B2
(45) Date of Patent: Jul. 22, 2014

(54) MEDIA DELIVERY SYSTEM AND METHOD FOR TRANSPORTING MEDIA TO DESIRED TARGET DEVICES

(75) Inventors: Luc Julia, Oakland, CA (US); Rafael Cortina, Berkeley, CA (US); John Grundback, San Francisco, CA (US); Maklouf Serghine, Newark, CA (US); Yohan Le Nerriec, Berkeley, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1986 days.

(21) Appl. No.: 11/531,182

(22) Filed: Sep. 12, 2006

(65) Prior Publication Data

US 2007/0078948 A1    Apr. 5, 2007

Related U.S. Application Data

(63) Continuation-in-part of application No. 10/888,606, filed on Jul. 9, 2004, and a continuation-in-part of application No. 10/888,633, filed on Jul. 9, 2004, and a continuation-in-part of application No. 10/888,745, filed on Jul. 9, 2004.

(60) Provisional application No. 60/718,119, filed on Sep. 16, 2005.

(51) Int. Cl.
*H04L 1/00*    (2006.01)
*G06F 17/30*   (2006.01)

(52) U.S. Cl.
CPC ............................. *G06F 17/30017* (2013.01)
USPC ............................ 370/232; 370/333; 709/232

(58) Field of Classification Search
USPC ........... 370/254, 265, 351, 363; 709/217, 241
See application file for complete search history.

(56) References Cited

U.S. PATENT DOCUMENTS

| 5,034,807 A | 7/1991 | Von Kohorn |
| 5,132,992 A | 7/1992 | Yurt et al. |
| 5,253,275 A | 10/1993 | Yurt et al. |
| 5,550,863 A | 8/1996 | Yurt et al. |
| 5,661,516 A | 8/1997 | Carles |
| 5,719,786 A | 2/1998 | Nelson et al. |

(Continued)

FOREIGN PATENT DOCUMENTS

| WO | WO 00/13688 | 3/2000 |
| WO | WO01/31852 | 5/2001 |

(Continued)

OTHER PUBLICATIONS

U.S. Appl. No. 10/006,914, filed Nov. 9, 2001, Julia, Luc.

(Continued)

*Primary Examiner* — Donald Mills
*Assistant Examiner* — Henry Baron
(74) *Attorney, Agent, or Firm* — Mahamedi Paradice LLP

(57) ABSTRACT

A media delivery system and technique are described to enable a media stream to be received at one end on a user's computer, and then re-streamed to a target device in a form that is suitable for that target. As an example of an implementation of such an embodiment, a streaming video and/or audio feed may be received on a user's media center, then re-streamed to a user's designated target device. The target device may correspond to, for example, another computer, a cell phone, or some other media output device.

52 Claims, 7 Drawing Sheets

(56) References Cited

U.S. PATENT DOCUMENTS

| | | |
|---|---|---|
| 5,774,170 A | 6/1998 | Hite et al. |
| 5,831,664 A | 11/1998 | Wharton et al. |
| 5,966,653 A | 10/1999 | Joensuu et al. |
| 6,002,720 A | 12/1999 | Yurt et al. |
| 6,101,534 A | 8/2000 | Rothschild |
| 6,144,702 A | 11/2000 | Yurt et al. |
| 6,157,621 A | 12/2000 | Brown et al. |
| 6,161,133 A | 12/2000 | Kikinis |
| 6,209,132 B1 | 3/2001 | Harrison et al. |
| 6,212,282 B1 | 4/2001 | Mershon |
| 6,263,503 B1 | 7/2001 | Margulis |
| 6,263,505 B1 | 7/2001 | Walker et al. |
| 6,310,886 B1 | 10/2001 | Barton |
| 6,312,336 B1 | 11/2001 | Handelman et al. |
| 6,327,608 B1 | 12/2001 | Dillingham |
| 6,349,410 B1 | 2/2002 | Lortz |
| 6,424,998 B2 | 7/2002 | Hunter |
| 6,430,603 B2 | 8/2002 | Hunter |
| 6,430,605 B2 | 8/2002 | Hunter |
| 6,437,836 B1 | 8/2002 | Huang et al. |
| 6,466,203 B2 | 10/2002 | Van Ee |
| 6,466,971 B1 | 10/2002 | Humpleman et al. |
| 6,470,378 B1 | 10/2002 | Tracton et al. |
| 6,477,589 B1 | 11/2002 | Suzuki et al. |
| 6,496,122 B2 | 12/2002 | Sampsell |
| 6,545,722 B1 | 4/2003 | Schultheiss et al. |
| 6,567,984 B1 | 5/2003 | Allport |
| 6,605,038 B1 | 8/2003 | Teller et al. |
| 6,611,863 B1 | 8/2003 | Banginwar |
| 6,629,163 B1 | 9/2003 | Balassanian |
| 6,658,461 B1 | 12/2003 | Mazo |
| 6,670,974 B1 | 12/2003 | McKnight et al. |
| 6,718,551 B1 | 4/2004 | Swix et al. |
| 6,721,705 B2 | 4/2004 | Kurganov et al. |
| 6,742,022 B1 | 5/2004 | King et al. |
| 6,754,904 B1 | 6/2004 | Cooper et al. |
| 6,754,907 B1 | 6/2004 | Schumacher et al. |
| 6,757,684 B2 | 6/2004 | Svendsen et al. |
| 6,757,906 B1 | 6/2004 | Look et al. |
| 6,763,226 B1 | 7/2004 | McZeal, Jr. |
| 6,825,858 B2 | 11/2004 | Sato |
| 6,826,589 B2 | 11/2004 | Berrada |
| 6,836,786 B1 | 12/2004 | Zoller et al. |
| 6,870,547 B1 | 3/2005 | Crosby et al. |
| 6,904,265 B1 | 6/2005 | Valdivia et al. |
| 6,928,490 B1 | 8/2005 | Bucholz et al. |
| 6,956,833 B1 | 10/2005 | Yukie et al. |
| 6,957,086 B2 * | 10/2005 | Bahl et al. ................ 455/557 |
| 6,959,235 B1 | 10/2005 | Abdel-Malek et al. |
| 6,968,179 B1 | 11/2005 | De Vries |
| 6,975,836 B2 | 12/2005 | Tashiro et al. |
| 7,010,002 B2 | 3/2006 | Chow et al. |
| 7,065,778 B1 | 6/2006 | Lu |
| 7,072,388 B2 | 7/2006 | Blakenet et al. |
| 7,089,066 B2 | 8/2006 | Hesse et al. |
| 7,098,772 B2 | 8/2006 | Cohen |
| 7,127,261 B2 | 10/2006 | Van Erlach |
| 7,130,582 B2 | 10/2006 | Barilovits |
| 7,139,834 B1 | 11/2006 | Albanese et al. |
| 7,165,224 B2 | 1/2007 | Pyhalammi |
| 7,177,872 B2 | 2/2007 | Schwesig et al. |
| 7,177,881 B2 | 2/2007 | Schwesig et al. |
| 7,188,312 B2 | 3/2007 | Hsiu-Ping et al. |
| 7,209,817 B2 | 4/2007 | Abdel-Malek et al. |
| 7,213,061 B1 | 5/2007 | Hite et al |
| 7,213,766 B2 | 5/2007 | Ryan et al. |
| 7,219,136 B1 | 5/2007 | Danner et al. |
| 7,233,990 B1 | 6/2007 | Debaty et al. |
| 7,246,009 B2 | 7/2007 | Hamblen et al. |
| 7,260,600 B1 | 8/2007 | Dunn et al. |
| 7,263,352 B2 | 8/2007 | Neuhaus et al. |
| 7,271,780 B2 | 9/2007 | Cok |
| 7,275,063 B2 | 9/2007 | Horn |
| 7,280,533 B2 | 10/2007 | Khartabil et al. |
| 7,284,046 B1 | 10/2007 | Kreiner et al. |
| 7,292,588 B2 | 11/2007 | Milley et al. |
| 7,310,680 B1 * | 12/2007 | Graham ................ 709/231 |
| 7,325,057 B2 | 1/2008 | Cho et al. |
| 7,328,173 B2 | 2/2008 | Taratino et al. |
| 7,360,087 B2 | 4/2008 | Jorgensen et al. |
| 7,363,258 B2 | 4/2008 | Svendsen et al. |
| 7,376,696 B2 | 5/2008 | Bell et al. |
| 7,376,901 B2 | 5/2008 | Shen et al. |
| 7,379,464 B2 | 5/2008 | Kreiner et al. |
| 7,379,986 B2 | 5/2008 | Kikinis |
| 7,468,744 B2 | 12/2008 | Edwards et al. |
| 7,483,964 B1 | 1/2009 | Jackson et al. |
| 7,486,926 B2 | 2/2009 | White et al. |
| 7,487,112 B2 | 2/2009 | Barnes, Jr. |
| 7,502,795 B1 | 3/2009 | Svendsen et al. |
| 7,519,393 B2 | 4/2009 | Bahl et al. |
| 7,526,314 B2 | 4/2009 | Kennedy |
| 7,561,299 B2 | 7/2009 | Elarde et al. |
| 7,565,547 B2 | 7/2009 | Matta et al. |
| 7,567,987 B2 | 7/2009 | Shappell et al. |
| 7,617,279 B2 | 11/2009 | Nakajima et al. |
| 7,724,281 B2 | 5/2010 | Vale et al. |
| 7,796,572 B2 | 9/2010 | Do et al. |
| 7,895,445 B1 | 2/2011 | Albanese et al. |
| 7,957,357 B2 | 6/2011 | Tysowski et al. |
| 8,018,850 B2 * | 9/2011 | van Beek et al. ............ 370/232 |
| 8,028,096 B2 | 9/2011 | Brune et al. |
| 8,045,952 B2 | 10/2011 | Qureshey et al. |
| 8,050,652 B2 | 11/2011 | Qureshey et al. |
| 8,059,537 B2 | 11/2011 | Karaoguz et al. |
| 2001/0045985 A1 | 11/2001 | Edwards et al. |
| 2001/0052019 A1 | 12/2001 | Walters et al. |
| 2001/0052942 A1 | 12/2001 | MacCollum et al. |
| 2001/0053274 A1 | 12/2001 | Roelofs et al. |
| 2002/0002707 A1 | 1/2002 | Ekel et al. |
| 2002/0010925 A1 | 1/2002 | Kikinis |
| 2002/0013852 A1 | 1/2002 | Janik |
| 2002/0026507 A1 | 2/2002 | Sears et al. |
| 2002/0041398 A1 * | 4/2002 | Ikeda et al. ................... 358/402 |
| 2002/0046406 A1 | 4/2002 | Chelehmal et al. |
| 2002/0056112 A1 | 5/2002 | Dureau et al. |
| 2002/0059637 A1 | 5/2002 | Rakib |
| 2002/0069309 A1 | 6/2002 | Balassanian |
| 2002/0083342 A1 | 6/2002 | Webb et al. |
| 2002/0091848 A1 | 7/2002 | Agresta et al. |
| 2002/0100063 A1 | 7/2002 | Herigstad et al. |
| 2002/0105534 A1 | 8/2002 | Balassanian |
| 2002/0108125 A1 | 8/2002 | Joao |
| 2002/0124258 A1 * | 9/2002 | Fritsch ................ 725/88 |
| 2002/0131072 A1 | 9/2002 | Jackson |
| 2002/0142721 A1 | 10/2002 | Souissi et al. |
| 2002/0146237 A1 | 10/2002 | Safadi |
| 2002/0147686 A1 | 10/2002 | Safadi et al. |
| 2002/0162120 A1 | 10/2002 | Mitchell |
| 2002/0188556 A1 | 12/2002 | Colica et al. |
| 2002/0188867 A1 | 12/2002 | Bushey et al. |
| 2003/0048295 A1 | 3/2003 | Lilleness et al. |
| 2003/0063770 A1 | 4/2003 | Svendsen et al. |
| 2003/0065407 A1 | 4/2003 | Johnson et al. |
| 2003/0065791 A1 | 4/2003 | Garg et al. |
| 2003/0093791 A1 | 5/2003 | Julia et al. |
| 2003/0093813 A1 | 5/2003 | Shintani et al. |
| 2003/0105831 A1 | 6/2003 | O'Kane |
| 2003/0105854 A1 | 6/2003 | Thorsteinsson et al. |
| 2003/0115284 A1 | 6/2003 | Henry |
| 2003/0118014 A1 | 6/2003 | Iyer et al. |
| 2003/0146977 A1 | 8/2003 | Vale et al. |
| 2003/0149874 A1 | 8/2003 | Balfanz et al. |
| 2003/0157960 A1 | 8/2003 | Kennedy |
| 2003/0192054 A1 | 10/2003 | Birks et al. |
| 2003/0200001 A1 | 10/2003 | Goddard |
| 2003/0208472 A1 | 11/2003 | Pham |
| 2003/0220835 A1 | 11/2003 | Barnes |
| 2003/0220995 A1 | 11/2003 | Hitaka et al. |
| 2003/0229667 A1 | 12/2003 | Pedersen et al. |
| 2004/0003097 A1 | 1/2004 | Willis et al. |
| 2004/0004663 A1 | 1/2004 | Kahn et al. |
| 2004/0004737 A1 | 1/2004 | Kahn et al. |
| 2004/0015589 A1 | 1/2004 | Isozu |

(56) References Cited

U.S. PATENT DOCUMENTS

| | | |
|---|---|---|
| 2004/0015820 A1 | 1/2004 | Balassanian |
| 2004/0044723 A1 | 3/2004 | Bell et al. |
| 2004/0045039 A1 | 3/2004 | Harrison et al. |
| 2004/0049624 A1 | 3/2004 | Salmonsen |
| 2004/0060071 A1 | 3/2004 | Shteyn |
| 2004/0066419 A1 | 4/2004 | Pyhalammi |
| 2004/0072584 A1 | 4/2004 | Kern |
| 2004/0088731 A1 | 5/2004 | Putterman et al. |
| 2004/0097251 A1 | 5/2004 | Barilovits |
| 2004/0097259 A1 | 5/2004 | Toor et al. |
| 2004/0100974 A1 | 5/2004 | Kreiner et al. |
| 2004/0103313 A1 | 5/2004 | Kreiner et al. |
| 2004/0103437 A1 | 5/2004 | Allegrezza et al. |
| 2004/0117442 A1 | 6/2004 | Thielen |
| 2004/0117845 A1 | 6/2004 | Karaoguz et al. |
| 2004/0117846 A1 | 6/2004 | Karaoguz et al. |
| 2004/0117849 A1 | 6/2004 | Karaoguz et al. |
| 2004/0123316 A1* | 6/2004 | Kendall et al. .............. 725/37 |
| 2004/0133694 A1 | 7/2004 | Karaoguz et al. |
| 2004/0139172 A1 | 7/2004 | Svendsen et al. |
| 2004/0148353 A1 | 7/2004 | Karaoguz et al. |
| 2004/0172440 A1 | 9/2004 | Nakajima et al. |
| 2004/0177319 A1 | 9/2004 | Horn |
| 2004/0192331 A1 | 9/2004 | Gorday et al. |
| 2004/0205168 A1 | 10/2004 | Asher |
| 2004/0221163 A1 | 11/2004 | Jorgensen et al. |
| 2004/0236442 A1 | 11/2004 | Maymudes |
| 2004/0237122 A1 | 11/2004 | Yamaguchi et al. |
| 2004/0250205 A1 | 12/2004 | Conning |
| 2004/0267873 A1 | 12/2004 | Shen et al. |
| 2005/0002640 A1 | 1/2005 | Putterman et al. |
| 2005/0005025 A1* | 1/2005 | Harville et al. .............. 709/241 |
| 2005/0021624 A1 | 1/2005 | Herf et al. |
| 2005/0021915 A1 | 1/2005 | Lowe et al. |
| 2005/0028208 A1 | 2/2005 | Ellis et al. |
| 2005/0037706 A1 | 2/2005 | Settle |
| 2005/0038923 A1 | 2/2005 | Kamataki |
| 2005/0052469 A1 | 3/2005 | Crosby et al. |
| 2005/0055455 A1 | 3/2005 | Asher |
| 2005/0055716 A1 | 3/2005 | Louie et al. |
| 2005/0062695 A1 | 3/2005 | Cok |
| 2005/0076058 A1 | 4/2005 | Schwesig et al. |
| 2005/0078620 A1 | 4/2005 | Balachandran et al. |
| 2005/0083904 A1 | 4/2005 | Khartabil et al. |
| 2005/0107031 A1 | 5/2005 | Wood et al. |
| 2005/0114490 A1 | 5/2005 | Redlich et al. |
| 2005/0120073 A1 | 6/2005 | Cho |
| 2005/0120391 A1 | 6/2005 | Haynie et al. |
| 2005/0136949 A1 | 6/2005 | Barnes, Jr. |
| 2005/0138560 A1 | 6/2005 | Lee et al. |
| 2005/0153707 A1 | 7/2005 | Ledyard et al. |
| 2005/0171661 A1 | 8/2005 | Abdel-Malek et al. |
| 2005/0171692 A1 | 8/2005 | Hamblen et al. |
| 2005/0172001 A1 | 8/2005 | Zaner et al. |
| 2005/0183120 A1 | 8/2005 | Jain et al. |
| 2005/0198040 A1 | 9/2005 | Cohen et al. |
| 2005/0198222 A1 | 9/2005 | Kohinata et al. |
| 2005/0201358 A1 | 9/2005 | Nelson et al. |
| 2005/0201529 A1 | 9/2005 | Nelson et al. |
| 2005/0215194 A1 | 9/2005 | Boling et al. |
| 2005/0223409 A1 | 10/2005 | Rautila et al. |
| 2005/0229243 A1 | 10/2005 | Svendsen et al. |
| 2005/0232186 A1 | 10/2005 | Karaoguz et al. |
| 2005/0234864 A1 | 10/2005 | Shapiro |
| 2005/0235048 A1 | 10/2005 | Costa-Requena et al. |
| 2005/0235329 A1 | 10/2005 | Karaoguz et al. |
| 2005/0240558 A1 | 10/2005 | Gil et al. |
| 2005/0242971 A1 | 11/2005 | Dryer |
| 2005/0246757 A1 | 11/2005 | Relan et al. |
| 2005/0256934 A1 | 11/2005 | Motoyama |
| 2005/0259618 A1 | 11/2005 | Ahya et al. |
| 2005/0283731 A1 | 12/2005 | Saint-Hilaire et al. |
| 2005/0286497 A1 | 12/2005 | Zutaut et al. |
| 2005/0289266 A1 | 12/2005 | Illowsky et al. |
| 2006/0010225 A1 | 1/2006 | Issa et al. |
| 2006/0010270 A1 | 1/2006 | Zhang |
| 2006/0015649 A1 | 1/2006 | Zutaut et al. |
| 2006/0015664 A1 | 1/2006 | Zhang |
| 2006/0020960 A1 | 1/2006 | Relan et al. |
| 2006/0026271 A1 | 2/2006 | Julia et al. |
| 2006/0036354 A1 | 2/2006 | Mackawa et al. |
| 2006/0047843 A1 | 3/2006 | Julia et al. |
| 2006/0080452 A1 | 4/2006 | Julia et al. |
| 2006/0085826 A1 | 4/2006 | Funk et al. |
| 2006/0092176 A1 | 5/2006 | Wang et al. |
| 2006/0095401 A1 | 5/2006 | Krikorian |
| 2006/0095471 A1 | 5/2006 | Krikorian |
| 2006/0095472 A1 | 5/2006 | Krikorian |
| 2006/0161635 A1 | 7/2006 | Lamkin et al. |
| 2006/0167985 A1 | 7/2006 | Albanese |
| 2006/0238335 A1 | 10/2006 | Karaoguz et al. |
| 2006/0248554 A1 | 11/2006 | Priddy |
| 2006/0253542 A1 | 11/2006 | McCausland et al. |
| 2006/0253894 A1 | 11/2006 | Bookman et al. |
| 2006/0256130 A1 | 11/2006 | Gonzalez |
| 2006/0268738 A1 | 11/2006 | Goerke et al. |
| 2006/0277318 A1 | 12/2006 | Julia et al. |
| 2006/0280157 A1 | 12/2006 | Karaoguz et al. |
| 2006/0288095 A1 | 12/2006 | Torok et al. |
| 2007/0027957 A1 | 2/2007 | Peters et al. |
| 2007/0038771 A1 | 2/2007 | Julia et al. |
| 2007/0061857 A1 | 3/2007 | Seki et al. |
| 2007/0067407 A1 | 3/2007 | Bettis et al. |
| 2007/0101011 A1 | 5/2007 | Mrsic-Flogel et al. |
| 2007/0118535 A1 | 5/2007 | Schwesig et al. |
| 2007/0118619 A1 | 5/2007 | Schwesig et al. |
| 2007/0168543 A1 | 7/2007 | Krikorian et al. |
| 2007/0173266 A1 | 7/2007 | Barnes |
| 2007/0189476 A1 | 8/2007 | Marsico et al. |
| 2007/0198532 A1 | 8/2007 | Krikorian et al. |
| 2007/0207755 A1 | 9/2007 | Julia et al. |
| 2007/0213980 A1 | 9/2007 | Danner et al. |
| 2007/0255785 A1 | 11/2007 | Hayashi et al. |
| 2007/0260604 A1 | 11/2007 | Haeuser et al. |
| 2007/0266169 A1 | 11/2007 | Chen et al. |
| 2007/0280138 A1 | 12/2007 | Stern |
| 2007/0294334 A1 | 12/2007 | Hickman |
| 2008/0021921 A1 | 1/2008 | Horn |
| 2008/0103975 A1 | 5/2008 | Taratino et al. |
| 2008/0127289 A1 | 5/2008 | Julia et al. |
| 2008/0189766 A1 | 8/2008 | Bell et al. |
| 2008/0232295 A1 | 9/2008 | Kreiner et al. |
| 2008/0259818 A1 | 10/2008 | Balassanian |
| 2008/0279098 A1 | 11/2008 | Park |
| 2010/0017462 A1 | 1/2010 | Thoen |
| 2010/0180307 A1 | 7/2010 | Hayes et al. |
| 2010/0186034 A1 | 7/2010 | Walker |
| 2011/0179140 A1 | 7/2011 | Julia et al. |
| 2012/0158917 A1 | 6/2012 | Julia et al. |
| 2012/0209958 A1 | 8/2012 | Julia et al. |
| 2013/0086466 A1 | 4/2013 | Levy et al. |

FOREIGN PATENT DOCUMENTS

| | | |
|---|---|---|
| WO | WO01/33839 | 5/2001 |
| WO | WO03/052552 | 6/2003 |
| WO | WO2005/122025 | 12/2005 |
| WO | WO 2006/010023 | 1/2006 |

OTHER PUBLICATIONS

U.S. Appl. No. 10/888,606, filed Jul. 9, 2004, Julia et al.
U.S. Appl. No. 10/888,633, filed Jul. 9, 2004, Julia et al.
U.S. Appl. No. 10/888,745, filed Jul. 9, 2004, Julia et al.
U.S. Appl. No. 11/325,797, filed Jan. 3, 2006, Julia et al.
U.S. Appl. No. 11/538,800, filed Oct. 4, 2006, Julia et al.
U.S. Appl. No. 60/577,833, filed Jun. 7, 2004, Krikorian.
Final Office Action for U.S. Appl. No. 10/888,745 mailed Sep. 2, 2008, 28 pages.
Final Office Action for U.S. Appl. No. 10/888,633 mailed Sep. 3, 2008, 25 pages.
Final Office Action for U.S. Appl. No. 10/006,914 mailed Oct. 18, 2006, 15 pgs.

(56) References Cited

OTHER PUBLICATIONS

Final Office Action for U.S. Appl. No. 10/006,914 mailed Feb. 4, 2008, 18 pgs.
Goldberg, et al., The Ninja Jukebox, conference proceedings from the 2nd USENIX Symposium on Internet Technologies and Systems, Oct. 11-14, 1999, pp. 37-46, Boulder, Colorado.
International Search Report and Written Opinion of the International Searching Authority for PCT/US05/24324 mailed Jul. 20, 2007.
Network, The Authoratative Dictionary of IEEE Standards Terms, 7th Edition 2000.
Non-Final Office Action for U.S. Appl. No. 10/006,914 mailed Jun. 12, 2007, 20 pgs.
Non-Final Office Action for U.S. Appl. No. 10/006,914 mailed Sep. 10, 2008, 23 pgs.
Non-Final Office Action for U.S. Appl. No. 10/888,633 mailed Jan. 9, 2008, 18 pages.
Non-final Office Action mailed Jan. 17, 2008 for US 2007/0207755 (U.S. Appl. No. 11/538,800) 11 pgs.
Non-Final Office Action for U.S. Appl. No. 10/888,745 mailed Feb. 12, 2008, 15 pages.
Non-Final Office Action for U.S. Appl. No. 10/006,914 mailed Jan. 26, 2006, 8 pgs.
Path Construction for Multimedia Applications, website material from: bnrg.cs.berkeley.edu/~zmao/cs294-1/multimediaReport.doc, circa Oct. 1999.
TV Brick Home Server, web site as of Dec. 2, 2003, <http://www.tvbrick.com>, provided by <http://archive.org> 4 pages.
TV Brick Home Server, web site as of May 20, 2004, <http://www.tvbrick.com>, provided by <http://archive.org> 4 pages.
TV Brick Home Server, web site as of Jul. 1, 2004, <http://www.tvbrick.com>, provided by <http://archive.org> 4 pages.
TV Brick Home Server, web site as of Jun. 12, <http://www.tvbrick.com>, provided by <http://archive.org> 4 pages.
TV Brick Home Server, web site as of Jun. 9, 2004, <http://www.tvbrick.com>, provided by <http://archive.org> 4 pages.
TV Brick Home Server, web site as of Jun. 8, 2004, <http://www.tvbrick.com>, provided by <http://archive.org> 4 pages.
TV Brick Home Server, web site as of May 25, 2004, <http://www.tvbrick.com>, provided by <http://archive.org> 4 pages.
TV Brick Home Server, web site as of May 8, 2004, <http://www.tvbrick.com>, provided by <http://archive.org> 4 pages.
TV Brick Home Server, web site as of Apr. 7, 2004, <http://www.tvbrick.com>, provided by <http://archive.org> 4 pages.
TV Brick Home Server, web site as of Mar. 22, 2004, <http://www.tvbrick.com>, provided by <http://archive.org> 4 pages.
TV Brick Home Server, web site as of Feb. 10, 2004, <http://www.tvbrick.com>, provided by <http://archive.org> 4 pages.
TV Brick Home Server, web site as of Dec. 28, 2003, <http://www.tvbrick.com>, provided by <http://archive.org> 4 pages.
TV Brick Home Server, web site as of Oct. 9, 2003, <http://www.tvbrick.com>, provided by <http://archive.org> 4 pages.
TV Brick Home Server, web site as of Jul. 19, 2003, <http://www.tvbrick.com>, provided by <http://archive.org> 4 pages.
TV Brick Home Server, web site as of Jul. 4, 2003, <http://www.tvbrick.com>, provided by <http://archive.org> 4 pages.
TV Brick Home Server, web site as of Jun. 29, 2003, <http://www.tvbrick.com>, provided by <http://archive.org> 4 pages.
TV Brick Home Server, web site as of Feb. 3, 2004, <http://www.tvbrick.com>, provided by <http://archive.org> 4 pages.
TV 'brick' opens up copyright can of worms, by Benoit Faucon, The Wall Street Journal (from Australian Financial Review) Jul. 1, 2003, published online Oct. 20, 2003 on http://mex-at-the-blogspot.com/search?q=brick, 1 page.
U.S. Appl. No. 09/304,973, filed May 4, 1999, Balassanian.
U.S. Appl. No. 09/498,016, filed Feb. 4, 2000, Balassanian.
U.S. Appl. No. 10/118,587, filed Apr. 8, 2002, Balassanian.
U.S. Appl. No. 60/341,574, filed Dec. 17, 2001, Balassanian.
U.S. Appl. No. 60/341,932, filed Dec. 18, 2001, Balassanian.
Final Office Action mailed Jul. 9, 2009 for U.S. Appl. No. 11/244,424 29 pages.
Final Office Action mailed Oct. 17, 2008 for US 2007/0207755 (U.S. Appl. No. 11/538,800); 16 pgs.
Non-final Office Action mailed Sep. 15, 2008 for US 2006/0277318 (U.S. Appl. No. 11/244,424); 17 pgs.
Citrix, Winview for Networks, Installation Guide. 320pages, 1990-1994.
Discover Desktop Conference with NetMeeting 2.0, by Mike Britton and Suzanne Van Cleve. 305pages, 1997.
Final Office Action for U.S. Appl. No. 10/888,606 mailed May 26, 2010, 36 pgs.
Final Office Action for U.S. Appl. No. 10/006,914 mailed Jun. 22, 2009, 30 pgs.
Final Office Action mailed Mar. 15, 2010 for U.S. Appl. No. 11/538,800, 14 pages.
Final Office Action mailed Apr. 6, 2010 for U.S. Appl. No. 11/422,419, 9 pages.
Final Office Action for U.S. Appl. No. 10/888,745 mailed May 20, 2010.
Final Office Action mailed Jul. 9, 2009 for U.S. Appl. No. 11/244,424 18 pages.
Non-Final Office Action for U.S. Appl. No. 11/875,824 mailed Mar. 2, 2010, 19 Pages.
Non-Final Office Action mailed Nov. 10, 2009 for U.S. Appl. No. 10/006,914, 24 pages.
Non-Final Office Action mailed Aug. 4, 2009 for U.S. Appl. No. 10/888,606, 24 pages.
Non-Final Office Action mailed Mar. 17, 2009 for U.S. Appl. No. 10/888,633, pp. 29.
Non-Final Office Action mailed Oct. 2, 2009 for U.S. Appl. No. 11/422,419, pp. 9.
Non-Final Office Action mailed Jun. 9, 2009 for U.S. Appl. No. 11/538,800, pp. 13.
Non-Final Office Action mailed Nov. 30, 2009 for U.S. Appl. No. 10/888,633, pp. 20.
Non-Final Office Action mailed Oct. 14, 2009 for U.S. Appl. No. 10/888,745, pp. 21.
Final Office Action for U.S. Appl. No. 11/244,424 mailed Mar. 15, 2011.
Final Office Action for U.S. Appl. No. 11/875,824 mailed Nov. 10, 2010.
Non-Final Office Action for U.S. Appl. No. 11/422,419 mailed Aug. 24, 2011.
Non-Final Office Action mailed Jun. 24, 2011 in U.S. Appl. No. 13/077,879.
Non-Final Office Action for U.S. Appl. No. 10/888,606 mailed Dec. 6, 2010.
Notice of Allowance for U.S. Appl. No. 10/888,745 mailed Mar. 4, 2011.
Final Office Action for U.S. Appl. No. 10/888,633 mailed Aug. 17, 2010.
Notice of Allowance for U.S. Appl. No. 11/538,800 mailed Nov. 25, 2011, 16 pages.
Final Office Action for U.S. Appl. No. 10/888,606 mailed Mar. 1, 2012, 20 pages.
Notice of Allowance for U.S. Appl. No. 13/077,879 mailed Feb. 16, 2012, 61 pages.
Final Office Action for U.S. Appl. No. 11/422,419 mailed Mar. 27, 2012, 9 pages.
Non-Final Office Action for U.S. Appl. No. 13/405,715 mailed May 22, 2012 10 pages.
Doi, S., et al, "Real-Time Remote File System for Multimedia Application," Jul. 30, 2000, IEEE, vol. 3, pp. 1727-1730.
Liechti et al, "iRemote: a Platform for Controlling Public Displays with Mobile Phones", ATR Media Integration and Communication Research Lab, http://www.interaction-ipsj.org/archives/paper2001/pdf2001/olivier.pdf, Dec. 2000, all pages.
Lim, Swee Boon & Condry, Michael, "A Remote File System for Heterogenous Network Topologies," Nov. 15, 1993, IEEE, pp. 103-108.
Supplementary Partial European Search Report—EP05771205—Search Authority—The Hague—Oct. 25, 2011 (132992EP).

\* cited by examiner

MEDIA DELIVERY SYSTEM AND METHOD FOR TRANSPORTING MEDIA TO DESIRED TARGET DEVICES

RELATED APPLICATIONS

This application claims priority to provisional U.S. Patent Application No. 60/718,119, filed on Sep. 16, 2005, entitled MEDIA DELIVERY SYSTEM AND METHOD FOR TRANSPORTING MEDIA TO DESIRED TARGET DEVICES; the aforementioned priority application being hereby incorporated by reference in its entirety.

This application is a continuation-in-part of the following, co-pending U.S. patent applications: U.S. patent application Ser. No. 10/888,606, entitled "System and Method for Enabling the Establishment of a Personal Network," filed Jul. 9, 2004; U.S. patent application Ser. No. 10/888,633, entitled "System and Method for Combining Memory Resources for Use on a Personal Network," filed Jul. 9, 2004; and U.S. patent application Ser. No. 10/888,745, entitled "System and Method for Remotely Controlling Network Resources," filed Jul. 9, 2004. All of the aforementioned priority applications are hereby incorporated by reference in their entirety for all purposes.

TECHNICAL FIELD

The disclosed embodiments relate generally to the field of media content delivery over networks.

BACKGROUND

There are an increasingly large number of devices that have network connectivity. Over the years, network connectivity has been extended to appliances such as refrigerators, home entertainment centers, and interactive box sets for use with television sets, digital cameras, and cell phones. With the evolution of these devices, there have been developments in home networks. For example, WIFI technology enables users to interconnect various network enabled devices wirelessly to form their own local area network. Various services and applications currently exist with the goal of establishing data connectivity between different network locations. The growth of the Internet and other types of networks has contributed to the numerous networking applications that currently exist.

There is also an interest in extending network connectivity to devices that can roam. These devices include cell phones, personal digital assistants (PDAs), and stations that can be assembled on vehicles or airplanes. While wireless networks for such roaming devices exist, these networks tend to have limited bandwidth, and can be expensive. In addition, it is difficult for operators of such devices to interact with networks, given that these devices often have poor user-interface features, and limited processing/memory resources for tasks that are often desired from them.

Currently, there are various interoperability issues when different types of network enabled devices are coupled. Often, the different devices operate on incompatible platforms or operating systems. This can cause problems in how these devices share data with one another. Furthermore, connected devices may use different data types (.WAV versus MPEG) and/or data formats that hinder the user's ability to share data amongst devices. As an example, the size of the screen display on a cell phone is typically too small to render images from a digital camera, even if the cell phone is camera-enabled. Often, the result is that when users want to share data amongst connected devices, that user must perform numerous manual steps, such as manually converting data formats.

Even as various computer and electronic devices increase their functionality, their hardware components, environment and form-factor become limitations that need to be accounted for when devices are sought to operate with one another. For example, many devices are capable of rendering or playing back rich media (e.g. music or video), but these devices have different levels of suitability for these functions. For example, a cell phone may have a music player software application, but limited speaker output for truly enjoyable music listening experience. As another example, cellular phones with cameras are common and widely used, but their images are not as good as devices that are primarily digital cameras.

DETAILED DESCRIPTION

Figure 1:
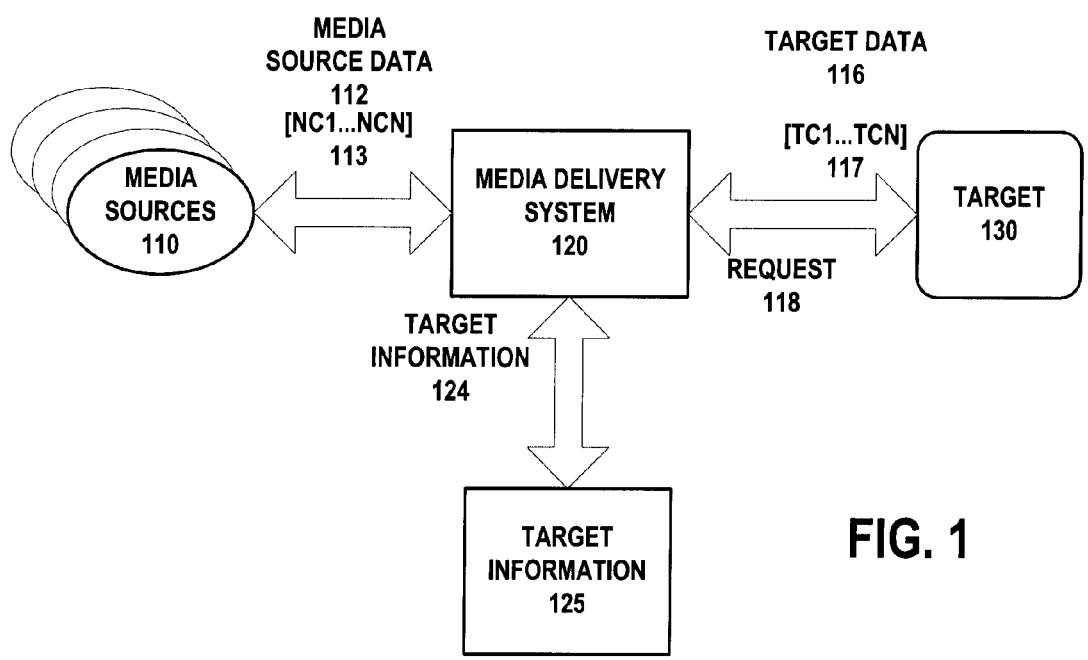
FIG. 1 is an illustration of a system or technique for transmitting target data corresponding to media to a target location or device, under an embodiment of the invention.

Embodiments described in this application provide the ability for a user to take media from any one of many sources and deliver media from that source to a selected target device or location in a form that is suited for that device or location. One or more embodiments described herein enable data corresponding to that media to be generated which is suitable or even optimal for a target device or location, when the media in its native form is actually not suitable for the target. As such, target data corresponding to media may be generated and delivered to the target to accommodate capabilities and limitations of the target. Examples of the limitations and capabilities that may need to be accounted for in generating the target data include the available bandwidth of the target; the target's processing and/or memory resources; the applications involved in handling media on the target, including web browser or media player; the display size or resolution of the target; and audio hardware on the target.

Embodiments described herein provide that media received or maintained on a network enabled system of a user may be transported across one or more networks to a desired target device or location. Any form of digital media is contemplated, including media files (e.g. MP3 files), television media received through a set top box or stored in a digital video recorder, or streaming media. In response to receiving an instruction for delivery of media from a target device, media source identified by the request may be identified and accessed. Media data from the source may be analyzed or inspected to determine its native characteristics. A profile for the target is accessed, and profile information is used to determine desired characteristics for the generation of target data that is to correspond to the media. The target data is generated from the media data or media source with the desired characteristics. If native characteristics of the media data/source are incompatible or otherwise different from the desired characteristics specified in the profile information, the target data is generated to include the desired characteristics, and not the native characteristics. The target data is then transmitted to the target.

An embodiment such as described may be performed programmatically, or as a computer-implemented method. Programmatically means through the use of code, or computer-executable instructions.

A particular type of media source contemplated for use with one or more embodiments is a streaming media source, such as provided through a streaming media service on the Internet. In one embodiment, the media source provides a media stream over the Internet or other network. A media delivery system and technique are described to enable the media stream to be received at one end on a user's computer, and then re-streamed to a target device in a form that is suitable for that target. As an example of an implementation of such an embodiment, a streaming video and/or audio feed may be received on a user's media center, then re-streamed to a user's designated target device. The target device may correspond to, for example, another computer, a cell phone, a personal digital assistant, a laptop, a network-enabled audio or media system for an automobile, or some other media output device.

Under an embodiment of the invention, the act of re-streaming the media stream may correspond to one or more of the following processes being performed: (i) the media stream being reformatted from one data type or extension to another; (ii) a transmission size of the media stream being reduced; and (iii) a display size of the media stream being re-sized.

As will be described, the processes mentioned above may also be performed for media from sources other than streaming sources. Furthermore, other processes may be performed on data generated from the media source for purpose of making the generated target data suitable for the target device or location.

The media sources may provide data having a particular set of native characteristics. These native characteristics may be different than desired characteristics for the target data, as specified in the profile information. In one embodiment, target data is generated by reconfiguring or reformatting data from the media sources so that the native characteristics are changed into the desired characteristics. However, it is also possible for a result in which the characteristics of the target data are identical to the native characteristics, meaning the media data in its original form is suitable for the target, at least according to the profile information.

One or more embodiments described herein may be implemented using modules. A module may include a program, a subroutine, a portion of a program, or a software component or a hardware component capable of performing one or more stated tasks or functions. As used herein, a module can exist on a hardware component such as a server independently of other modules, or a module can be a shared element or process of other modules, programs or machines. A module may reside on one machine, such as on a client or on a server, or a module may be distributed amongst multiple machines, such as on multiple clients or server machines.

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor (s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

FIG. 1 illustrates a system for delivering media to a target device, under an embodiment of the invention. A media delivery system 120 may be part of a user's personal network or network enabled system. The media delivery system 120 enables the user to distribute a variety of different media that is available from his or her defined network or network enabled device to locations that are remote to his network location. In particular, an embodiment enables the user to distribute media to one or more selected roaming devices. Roaming devices include devices that communicate on cellular networks, satellite networks, or which are portable and can be connected to the Internet intermittently. Furthermore, as described elsewhere in this document, the distribution may be made at the request of the target. For example, the user may operate his own media player-enabled cellular phone to request music files from his connected media center (which may run on a desktop computer). Various types of media sources available to the home network or network user are contemplated for this type of media distribution, including, for example, stored media files, live video captured by the user on his own connected video camera, streaming media from an Internet streaming service, and television/audio cable and satellite feeds.

In an embodiment, the media delivery system 120 uses media source data 112 from one or more media sources 110 to deliver target data 116 to one or more targets 130. The media delivery system 120 may access profile 125 to obtain target information 124. The target information 124 may dictate how data from the media source is to be configured in the generation of target data 116. As such, target data 116 is configured for the target 130, even through media source data 112 in its original form may not be suitable for the target. An embodiment such as described enables any network enabled device or location to receive target data 116 that is suited for the particular device/location, and thus allow that device/location to generate media output corresponding to the media source data 112.

As will be described, the media sources 110 may correspond to one or more different types, including, for example, stored media files, streaming media from external sources or services, and media feed data from cable or satellite links. Media may correspond to audio data, image data or a combination thereof. Image data may correspond to both still and video data.

In an embodiment, the target 130 corresponds to a device that the media delivery system 120 can communicate with through one or more networks. According to one embodiment, the target 130 corresponds to a mobile or roaming device, such as a device that uses a cellular network to transmit voice or other data. Examples of such devices include smart phones (such as those that run on the SYMBIAN operating system), wireless phone and messaging devices (e.g. TREO 650, manufactured by PALMONE, INC.), personal digital assistants with roaming or cellular capabilities, and devices with roaming or cellular cards. In another implementation, the target corresponds to any network-enabled machine, such as a laptop. Still further, the target 130 may correspond to a network location, such as an Internet address, which a user can access from a standard Internet connection.

In one implementation, media may be delivered to the target 130 (in the form of target data 116) in response to a request 118 from the target. In another implementation, the request to deliver target data 116 to the target 130 may originate from another terminal or network location. The user may specify the request on one machine, and receive the target data 116 on another. For example, the user may send the request from a work terminal or even from a terminal on which the media delivery system 110 operates, to receive media on-the-go through his cell phone. Still further, rather than receive the request 118 from the user, the initiation of media delivery to the target 130 may be programmatic or event driven (e.g. such as through use of a calendar or scheduler).

The media delivery system 120 may receive the media source data 112 in its native form, meaning the media source data 112 may have a set of native characteristics 113. Such native characteristics 113 include, for example, transmission size, data format, and display size (for image data). The media delivery system 120 may have full capabilities to receive and handle media from numerous media sources. This may include broadband Internet access, video and audio processing resources, memory to buffer or cache (large RAM), and a large display. An example of media delivery system 120 would be a desktop machine that runs MICROSOFT MEDIA CENTER. For a given media source, some or all of the native characteristics 113 may be unsuitable or unwanted for the target 130. The media delivery system 120 generates the target data 116 to have target characteristics 117 using the target information 124. In the case where the media source 110 is completely compatible with the target 130, the target characteristics 117 and the native characteristics 113 may be the same or substantially similar, so that the target data 116 and the media source data 112 are also substantially similar. In such a case, for example, the target data 116 may simply be a copy of the media source data 112. In the case where one or more native characteristics 113 are not compatible or are unwanted, the target data 116 may be generated by implementing a conversion process on the media source data 112. In such a case, one or more of the resulting target characteristics 117 of the target data 116 may be different than the native characteristics 113 of the media source data 112. For example, one or more of the characteristics transmission size, data format, and display size may be different for the target data 116, as compared to the media source data 112.

The media delivery system 120 may access one or more target profiles 125 associated with the target 130 to obtain target information 124. The target profiles 125 may correspond to a list of device capabilities and/or a list of user-preferences. The profile information may include information on how to configure or format the target data to accommodate, for example, the following capabilities or limitations of the target: the network bandwidth available to the target; the target's processing and/or memory resources; the applications involved in handling media on the target, including web browser or media player; the display size or resolution of the target; and audio hardware on the target. Some or all of the target information 124 may be determined programmatically, or at least without user-input. For example, target information 124 corresponding to a device profile may be retrieved from a library based on initial device information identified from the user's communication, either through user-input or through other means.

Embodiments of the invention enable users to establish a media center from within the confines of a network that is under their control, and to use the media center to stream media of their choosing to devices and locations of their designation. This enables the user to make his or her media library available to numerous devices and/or locations of his choosing. An example of an application of an embodiment described herein includes a user making a music library or video library accessible for streaming playback on a cellular phone or portable computing device, where the music or video library is stored on the user's hard drive, on a computer within his home network. In another embodiment, a system may be implemented in which streaming media from a source outside of the user's network is streamed to a station or component within the user's network, then re-streamed to the user's end device.

Methodology

Figure 2:
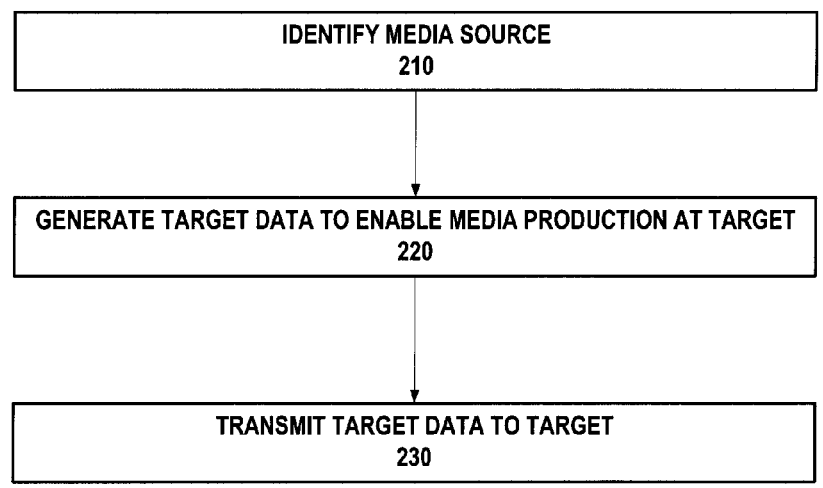
FIG. 2 illustrates a method for transmitting target data corresponding to media to a target device using profile information associated with that device, under an embodiment of the invention.

FIG. 2 illustrates a method for transmitting media data to a target, under an embodiment of the invention. Methods such as described by FIG. 2 or FIG. 3 may be performed on a user's defined network. The user's defined network may correspond to a subnet of one or more computers under a user's control that are interconnected by a local network connection (e.g. Ethernet) or a through a local connection (e.g. through a serial buss). One example of a user-defined network for use with an embodiment of the invention is a personal network, such as described in: U.S. patent application Ser. No. 10/888,606. A personal network is a networked system that uses individual software and/or hardware components as satellites. The satellites are (i) interconnected and aware of each other's status and capabilities (at least when it is relevant), and (ii) able to use each other's functionality. However, alternative embodiments may be implemented in which a system achieves functionality such as described using non-satellite components. For example, as mentioned, the user defined network may include a home network, or a home network combined with an external station that are not aware of each other's status and/or capabilities.

Another example of a user-defined network is a home network, in which a portal or gateway may be used to interconnect one or more computers with a user's home or space to a public network such as the Internet. According to embodiments described herein, a user's defined network may contain a media library of stored media files, media sources (e.g. cable television or satellite feed, live video camera) contained within the user-defined network or under its control, and external media sources that are accessible to the user-defined network over networks such as the Internet (e.g. streaming media services). These examples of user-defined networks (personal network, home network) and other network enabled systems are contemplated for performing methods such as described in FIG. 2 and FIG. 3. In describing the methods provided below, reference may be made to elements of FIG. 1 or other embodiments described in this application. Such reference is made for purpose of illustrating a suitable element or component for performing a step or sub-step being described.

Step 210 provides that a media source is identified. The media source may be based on a request or identification provided by the user, made at any time. The media source may correspond to any source from which media data may be retrieved, generated or received, such as a stored file or a live or ongoing media transmission. The media data provided by the media source may be in the form of audio, video, or a combination thereof. The media source may be internal or external to a user's defined network or computer system. As will be described below, the media data may be from anyone of numerous sources, and in anyone of various formats. For example, the media data may be received as streaming media, retrieved from a stored location, from a cable or satellite media feed, or from a connected device that records media (e.g. video recorder).

In step 220, target data is generated from the media source, or from media data provided from the media source, to accommodate a profile associated with the target. The profile may be based on the capabilities of the target and/or the preferences of the user. The profile specifies formatting and configurations for the target data. In an embodiment, the profile specifies the one or more of the following characteristics for the target data: data format, transmission size, and display size. If the native characteristics of the media source do not conform with the characteristics specified by the profile, a conversion or configuration process is performed on media data from the media source in order to make the target data have the desired characteristics. Thus, for example, if a media player of the target requires data to be of a certain type, then a conversion process may be performed to convert the data format of data provided by the media source from a native format to the desired data format. As additional examples, additional conversion or configuration processes may be performed on data generated from the media source in order to generate the target data with desired transmission size or display size.

Step 230 provides that the target data is transmitted to the target. The data transmission may be performed in response to the target device accessing or making a request for data (pull), or it may be performed by transmitting the target data without the request from the target device (push). In an embodiment where the target is a mobile device (such as one using that is cellular enabled), the target data may be streamed. When data is streamed, the mobile or receiving device may respond to receipt of a portion of the overall transmission and initiate playback before the transmission is complete. Thus, the streaming process usually requires buffering on the receiving end. Another embodiment may use another form of data transmission for the target data. Under one embodiment, the target data may be transmitted as one file to the target, such as in the form of an email attachment. Alternatively, one or more (e.g. a series) of Multimedia Messaging Service (MMS) messages may carry the target data to the target. Numerous data transmission techniques may be used, some of which are described below (see e.g. FIG. 6A-FIG. 6D).

The manner in which a method such as described by FIG. 2 is performed may differ, depending on the type of media source involved. For example, in a case where the media source corresponds to one or more media files stored locally within the control of the user-defined network, a temporary copy or conversion file may be formed as a result of step 220. In the case where the media source is an external streaming source, a buffer may be used to capture the stream while the media delivery system re-streams the data to the target device.

Figure 3:
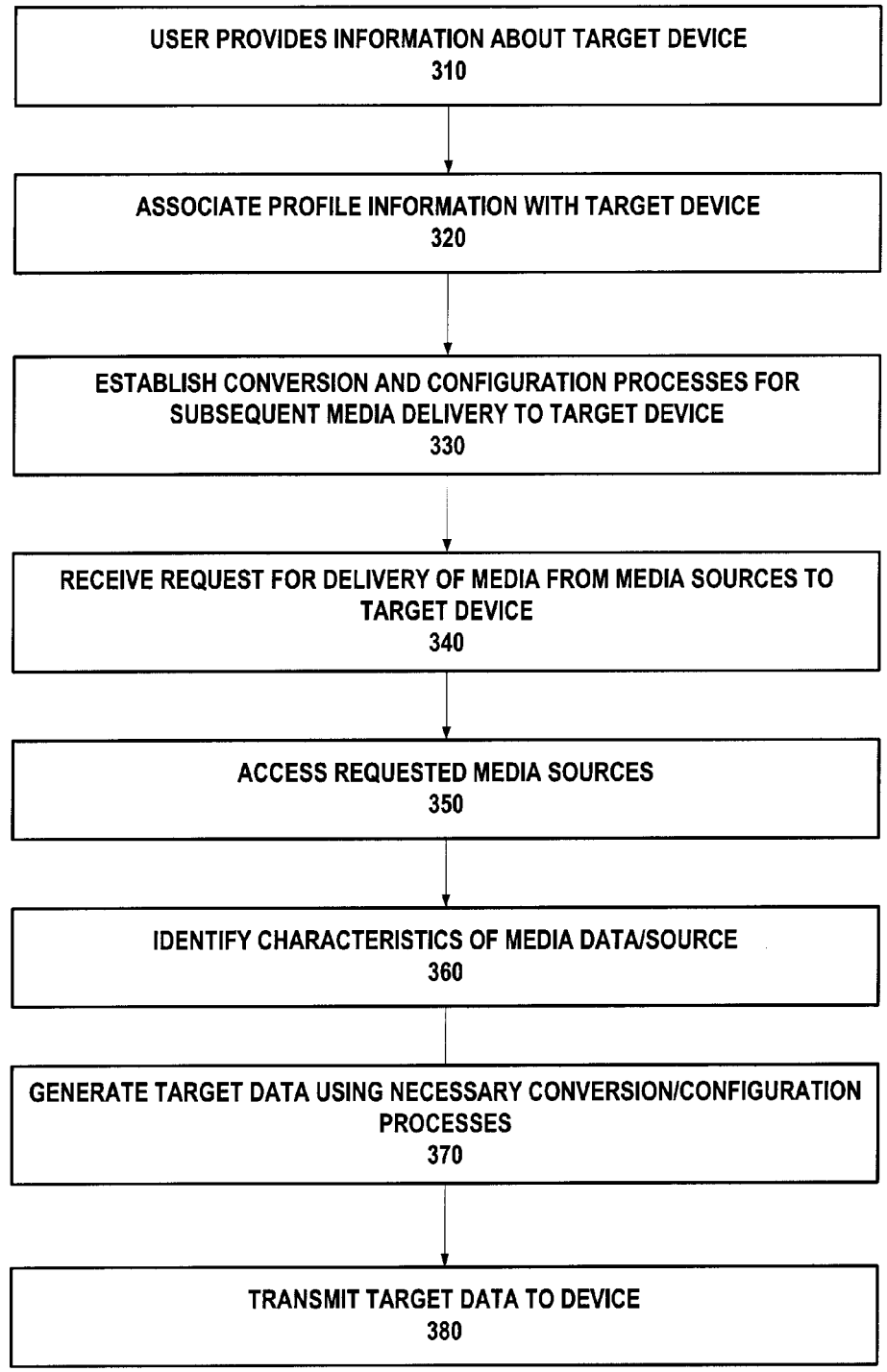
FIG. 3 illustrates a method for providing media from a user's defined network to a target device, under an embodiment of the invention.

FIG. 3 illustrates a more detailed method for enabling media to be transmitted from a user-defined network to a target device, under an embodiment of the invention. A method such as described in FIG. 3 assumes the target is a device that is accessible to the user-defined network using data networks such as the Internet and/or cellular networks.

In step 310, a user of the user-defined network provides information about the target device. The information may include information about the type or capabilities of the target. Additionally, information may be provided for locating the target device and/or for identifying or verifying the device.

Step 320 provides that profile information is associated with the target device. The profile information may correspond to information that identifies known capabilities of the target device, or of the target device's ability to handle media. For example, in the preceding step, the user may identify his cellular model, and a module or program on the user-defined network may correlate the device model with a list of pertinent capabilities of that device. In the same example, the user may also specify his media player, his cellular network, additional memory (e.g. smart card) or other information. To this end, a library may be maintained with information about different devices. The library may be programmatically accessed by, for example, a media delivery system (such as illustrated with FIG. 4) to determine how target data is to be configured. Examples of what type of information may be maintained in the library based on device capabilities include one or more of the following: media player type, display size, operating system, cellular network (if applicable), processing or memory capabilities, maximum transmission size. Additionally, profile information may include one or more user preferences. For example, the user may specify a desired transmission size that is less than the maximum transmission size. The user may also specify, for example, alternative display sizes, or implement filters.

In step 330, conversion and configuration processes may be established or otherwise made available to the user-defined network for purpose of enabling the media delivery system 120 to perform on-the-fly processes to generate target data with desired characteristics specified in the profile information. In particular, embodiments provide that in instances where the media source is, in its native form, incompatible or inconsistent with characteristics specified by the profile information, then the target data is generated with the desired characteristics specified by the profile information by performing conversion or configuration processes on data from the media source. The processes identified in this step may accommodate any one of a variety of media sources, including media sources that are both internal and external to the user-defined network. For example, processes may be identified to convert media files from any one of a plurality of data formats into a desired data type that is compatible with a particular type of media player on the target device. As another example, processes may be identified to convert streaming data from external sources, having any given data type, transmission size, or display size, into streaming data of a particular data type, transmission size and/or display size. Since the processes may be performed on-the-fly, streaming media from a media source external to the user-defined network may be converted/configured and transmitted to the target concurrently with transmission of the stream from the external source. If the native form of the media source is compatible with the characteristics specified in the profile information, then the target data may be generated by, for example, copying and/or buffering the media file or media data from the media source.

Once the target is identified, the profile is established, and the conversion/configuration processes are identified, the target may be used to retrieve and playback media from the user's defined network. In an embodiment, step 340 provides that a request for media is made from the target. The request may include identifiers for identifying the media source, or when applicable, particular data available from the media source. For example, the identifier may identify a streaming media source, a particular file, a uniform resource locator (URL) (or partial URL), or a media channel in the user's network (such as a channel designating a cable television channel, or a channel that represents a media feed from the user's own video recorder). Different implementations are contemplated for the form in which the request can be made. For example, the user may select an icon representing an action (get media from a streaming media service) or a source. The user may enter text data (through key strokes or even through voice recognition) to select the media source.

According to one embodiment, the target device may be equipped with a user-interface that displays media in a user's defined network, as well as media sources that the user has access to from his or her network. Such a user-interface is described in U.S. patent application Ser. No. 10/888,606, the aforementioned application being hereby incorporated by reference. Thus, for example, the user may select an icon from a graphical user interface (GUI) where the icon corresponds to a "channel", and the channel may correspond to, for example, a streaming media source, such as an Internet radio site. Another icon on the same interface may represent another media source, of a different type (stored files of an album, or channel from a television cable feed). Thus, selectable user-interface features may be provided on a single interface for connecting the user's remote or roaming device with distinct media sources, possibly of different types. For example, icons on one interface may represent a stored audio collection, cable television channel, and Internet streaming service. With regard to Internet streaming services or sites, specific media available from those services and sites may further be indicated. For example, the specific station on an Internet radio site may be specified in the request.

Step 350 provides that the requested media source is accessed for media data. The requested media source may be an external streaming media source, such as an Internet radio or television site, in which case the web site and/or uniform resource locator (URL) for that site is used to retrieve media data from the media source from within the defined network. In the case of streaming media sits, the media data may be buffered. As an example of another implementation, stored media files may be opened in this step, and/or the contents of the media files may be copied for the processes that are to be performed (if any).

In step 360, a set of characteristics of the media data and/or the requested media source are identified. The identification of the characteristics may be performed programmatically. The particular characteristics that are sought for identification in this step may be designated by the profile associated with the target device. Thus, for example, different characteristics may be evaluated for different target devices. Specific media data characteristics that may be identified include, for example, data format, transmission size, and display size for image data.

Step 370 provides that target data is generated from the data of the requested media sources. The target data is generated with consideration or use of the established conversion and configuration processes. Thus, if characteristics identified in step 360 are incompatible or different than what was specified in the profile information associated with the target, corresponding processes are performed to make the data conforming to the desired characteristics specified by the profile information. If conversion or configuration processes are necessary, the processes that are to be performed may be selected from a library of processes established in step 330. If, however, the characteristics identified in the step 360 are completely conforming to the desired characteristics specified in the profile information, then no configuration or conversion processes need to be performed. The target data generation then becomes a process to buffer and/or copy some or all of the media source data.

Step 380, the target data is transmitted to the target device. Different modes of data transmission are contemplated by embodiments of the invention. In particular, the target data may be streamed to the target device. Alternatively, the target data may be messaged, such as through an attachment to an email. As another example, an alternative messaging medium such as Multimedia Messaging Service (MMS) may be used. Examples of different transmission techniques are shown in greater detail with FIGS. 6A-6D and elsewhere in the application.

Architecture for Media Delivery System

Figure 4:
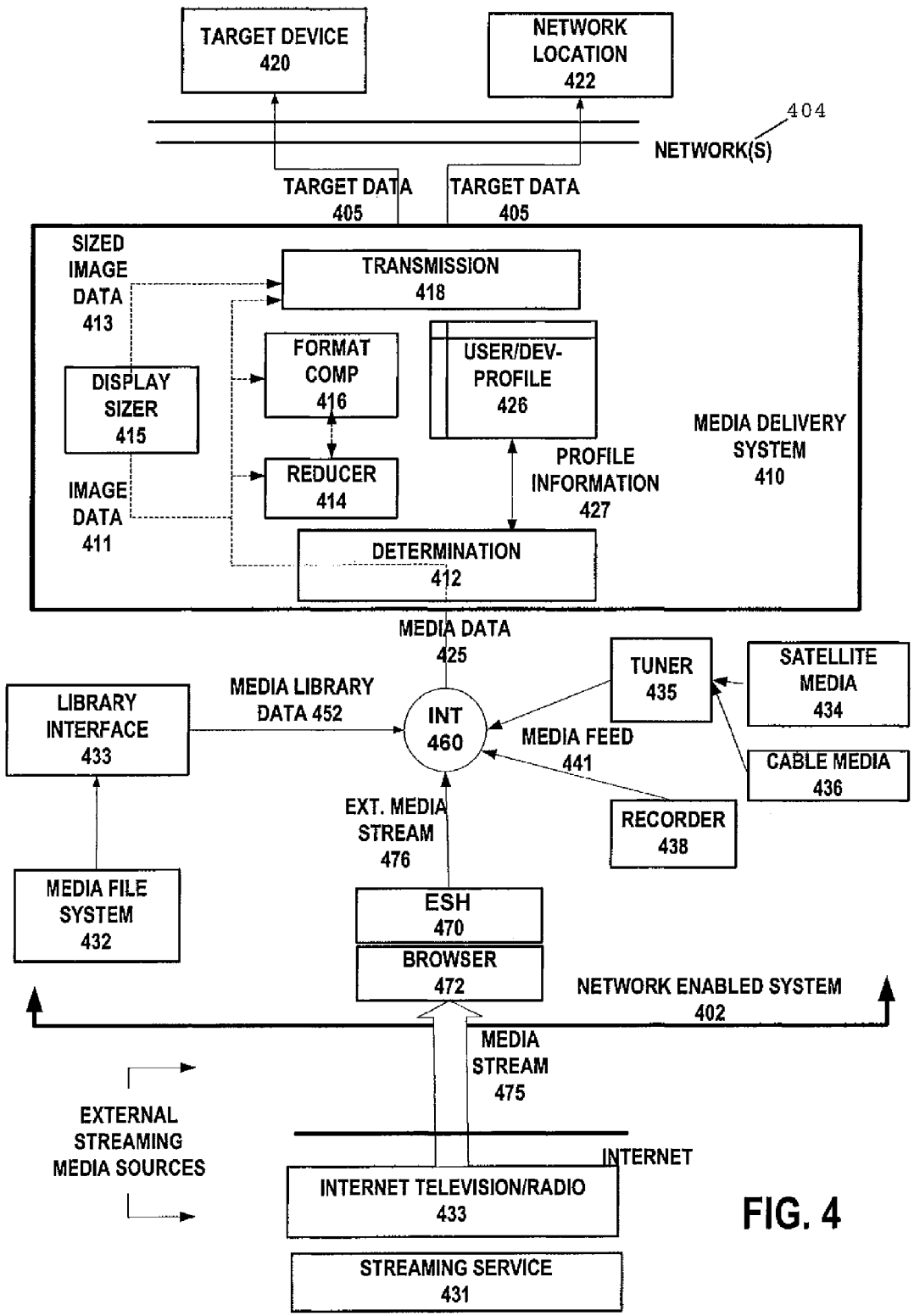
FIG. 4 illustrates an architecture for delivering media from various sources to a target, under an embodiment of the invention.

FIG. 4 illustrates a system for delivering media to a target location or device, under an embodiment of the invention. A system such as shown and described may be implemented as part or within a user's defined network. For example, the system shown may operate at least partially within a desktop computer used to manage a home network, or a computer on which Microsoft Media Center (manufactured by the Microsoft Corporation) is running. However, a user's defined network may extend to network locations that are provided by third-party services, for which the user has permission to access and use (for example, an account). In many cases, the user's defined network is maintained substantially within a gateway or firewall, interconnected by a local network such as WIFI and/or Ethernet. However, the user's network may extend to physical locations that are reachable across the Internet or other public networks, so that the user's defined network may include one or more externally located stations, terminals, computer clusters etc.

According to one embodiment, a system such as described in FIG. 4 may be implemented through use of a personal network as described in: U.S. patent application Ser. No. 10/888,606. However, alternative embodiments may be implemented in which a system archives functionality such as described using non-satellite components. For example, as mentioned, the network enabled system shown in FIG. 4 may correspond to a home network, or a home network combined with an external station each of which are not aware of each other's status and/or capabilities. Another example of a network enabled system includes two or more devices locally connected and network enabled from behind a gateway.

In FIG. 4, a network enabled system 402 that includes a media delivery system 410. The media delivery system 410 communicates with one or more targets, including, for example, a target device 420 and/or a network location 422. The targets may reside outside of the network enabled system 402 and be reachable through one or more networks 404, such as the Internet and one or more cellular networks. The target device 420 may correspond to, for example, a cellular or smart phone, a media player with a network connection (the network connection may be wireless or landline), a notebook computer, an automobile having satellite media delivery, or a workstation. The target network location 422 may be on a site that is accessible to an audience of target devices or users. For example, the network location 422 may correspond to a web service or web page through which media can be streamed.

According to an embodiment, components of media delivery system 410 includes a determination module 412, a reducer 414, a display sizer 415, a formatting component 416, and a transmission module 418. Each of these components may be implemented as a module. In one embodiment, the media delivery system 410 is capable of receiving media from anyone of a plurality of sources and locations, including internal and external sources. Thus, media data 425 may be received by the media delivery system 410 from a plurality of sources.

One or more profile structures 426 may exist as a source for profile information 427. The profile structures 426 may store profile information 427 corresponding to capabilities and limitations of the target device. These may include, for example, information indicating what the device can handle based on processing and memory resources (e.g. cache) of the target, the media player type or web browser used by the target, the modem connection (if any) of the target, the display size and/or resolution of the target, the operating system running on the target device, congestion characteristics or bandwidth information on the communication networks used by the target device, and the type or model of the target. Profile information 427 about the target device(s) may be determined programmatically or manually. For example, in one embodiment, the first communication in the form of a request for target data from the target device's web browser may be used to programmatically determine the type of web browser in use on that device. As described elsewhere, programmatic timing mechanisms may be used to determine available bandwidth for the device, particularly at a given instance. Other information may be manually entered by the user. In addition to profile information 427 accommodating specific device capabilities or limitations, the profile information may also correspond to specific preferences of the user. For example, the user may have a preference as to the transmission size of streaming media (low quality), or to the particular media player he or she wants to use.

According to an embodiment, the determination module 412 inspects the media data 425 for its native characteristics. The determination module 412 may also access profile information 427 from a user/device profile 426 to determine what native characteristics of the media data 425 need to be changed or unchanged. Using profile information 427, the determination module 412 determines what components are to be used.

Examples of media sources that can be accessed by the media delivery system 410 include internal (to the network enabled system 402) sources such as individual files in a media file system 432, a satellite outlet 434 or a cable outlet 436. Another specific example of a media source includes a specific file contained in the memory drive of a digital video recorder (e.g. TiVo). Another example of an internal media source includes a local media recorder 438 (video camera) from which live media streams are generated. External media sources may include streaming media sites and services, such as an Internet Television/Radio 433 site or streaming service 431 (e.g. RHAPSODY, STREAMWAVE). However, it should be noted that the sources of media are diverse and increasing with time. For example, "podcasting" sites provide non-streaming media files to users, and are contemplated for use with embodiments of the invention.

In an embodiment, the following processes may be performed in order to convert or configure media resources, based on the results of the determination module 412 inspecting the media data 425.

Data Reduction: If the media data 425 is incoming (external stream, cable television etc.) and has an inherently large transmission size, the determination module 412 may have one or more data reduction processes performed on the media data. The transmission size may correspond to a bit rate for the transmission. The bit rate is a function of a frame rate and picture quality. The bit rate is normally determined by the media source, which uses a high bit rate to improve picture quality and/or frame rate. The data reduction parameters may be set as one of preference or necessity. For example, in order to free network bandwidth, the user may have a preference as to lower transmission size. Additionally, the network bandwidth a device may need may be determined independent of the device's capabilities. Rather, the available bandwidth may be a function of the bandwidth on the communication channel to the device. In one embodiment, this profile information is determined programmatically, by sending a test message or communication to a specific target and measuring a response time. For example, an image or media clip may be transmitted periodically to the end target device from a component on the user's network system, and the component may measure the time it takes for a programmatic response or receipt to that message to be received back from the target. Based on response time, the profile information indicating bandwidth and/or data reduction parameters may be set.

Formatting: The determination module 412 may use profile information 427 to determine information about the data type of media that can be handled by the target. For example, the profile information 427 may identify the type of media player on the target device 420. If inspection of the media data 425 determines that the format of the media data is not compatible with the media player on the target device 420, then the formatting component 416 may be used to convert the data format. Implementation of the formatting component 416 may correspond to identification of a specific process that converts the media data from its native format to another format suitable for consumption by the target device 420. For example, a process may be called to convert the media data 425 from WMP to AAC.

Image Sizing: The determination module 412 may inspect media data 425 to determine whether image data 411 is contained in the media data 425. If image data 411 is contained, then the determination module 412 may use profile information 427 to determine if any size constraints exist for the target that is to receive the media data. For example, cellular phones have size limitations in their dimension and screen resolution. The determination module 412 may size the image data portion (sized image data 413) of the media data 425 in order to make the video or images of the media data compatible with the display hardware of the target device 420. In addition to size limitations, some target devices may have alternative size capabilities. For example, the device may have an elongated display and alternative display mode operations where the device may be operated in a landscape mode. The sizer 415 may accommodate the landscape settings with the image data, even by extrapolating or stretching image data.

The particular order that the processes are performed are design implementations. It is also possible to perform some or all of the processes of the individual components concurrently.

For different media sources, the network enabled system 402 may include components to interface and handle interface with the media sources, handle media data from the media resources, and even control the media sources. One or more application program interfaces 460 may be used to receive and connect to the different interfaces of the media sources. In one embodiment, a media library interface 433 may provide a programmatic mechanism for retrieving media data from the media file system 432 in response to individual requests of the user. Media library data 452 may be generated form individual files in the media file system 432. Other internal media sources, such as cable media source 436 or satellite media source 434 may feed raw media data into a set top box or tuner 435. A connection may be established between the tuner 435 of the respective satellite media source 434 or cable media resource 436, and the interface 460 of the media delivery system 410. A media feed 441 may be transmitted across the connection as output of the tuner 435. The local media recorder 438 may also transmit recorded media feed (albeit of a different type) to the interface 460 of the media delivery system 410.

External Media Handling

Embodiments of the invention enable the media delivery system, such as described in FIG. 4, to receive and transmit streaming media that comes from a media source outside of the system 402. In an embodiment, external media sources may be accessible to receive media data in the form of streaming network transmissions. To handle such media data, an external stream handler (ESH) 470 may be used in conjunction with the media delivery system 410. In one implementation, the ESH 470 and the media delivery system 410 may form locally interconnected components, or even reside within the same network enabled machine. As locally interconnected components, the ESH 470 and the media delivery system 410 may communicate over a direct or local communication link, such as through a WIFI connection, over a LAN or across a Universal Serial Bus connection. Alternatively, the ESH 470 and the media delivery system may reside within the same machine as software components. In this way, the media delivery system 410 and the ESH 470 may share a common firewall or gateway architecture to the Internet.

In one embodiment, the ESH 470 includes one or more buffers that operate in conjunction with the user's browser component 472, which could be, for example, a web browser or a media player, to receive streaming media of various types, sources and transmission size. The browser component 472 may be instructed to access network sites or locations as specified by the user's request. Other user-initiated or programmatic instructions may be employed to cause the browser component 472 to retrieve the specific desired media from the accessed site. For example, the browser component 472 may be used to select a link to a specific radio station or television station on a web page of an accessed site, and on selection of the link, streaming media data may be received by the web browser and directed to the ESH 470. Functions performed by the ESH 470 include receiving and buffering media streams 475 from external streaming media sources 431, 433, and then moving streaming data 476 to the media delivery system 410. In one embodiment, the ESH 470 directs buffered media data 476 from one portion of a transmission of media stream 475, concurrently while receiving transmission of another portion of the same media stream 475. In one embodiment, ESH 470 operates in coordination with a browser component 472, such as a web browser or a browser-enabled media player. The browser component is used to access the network site from which the media stream is received.

Figure 5:
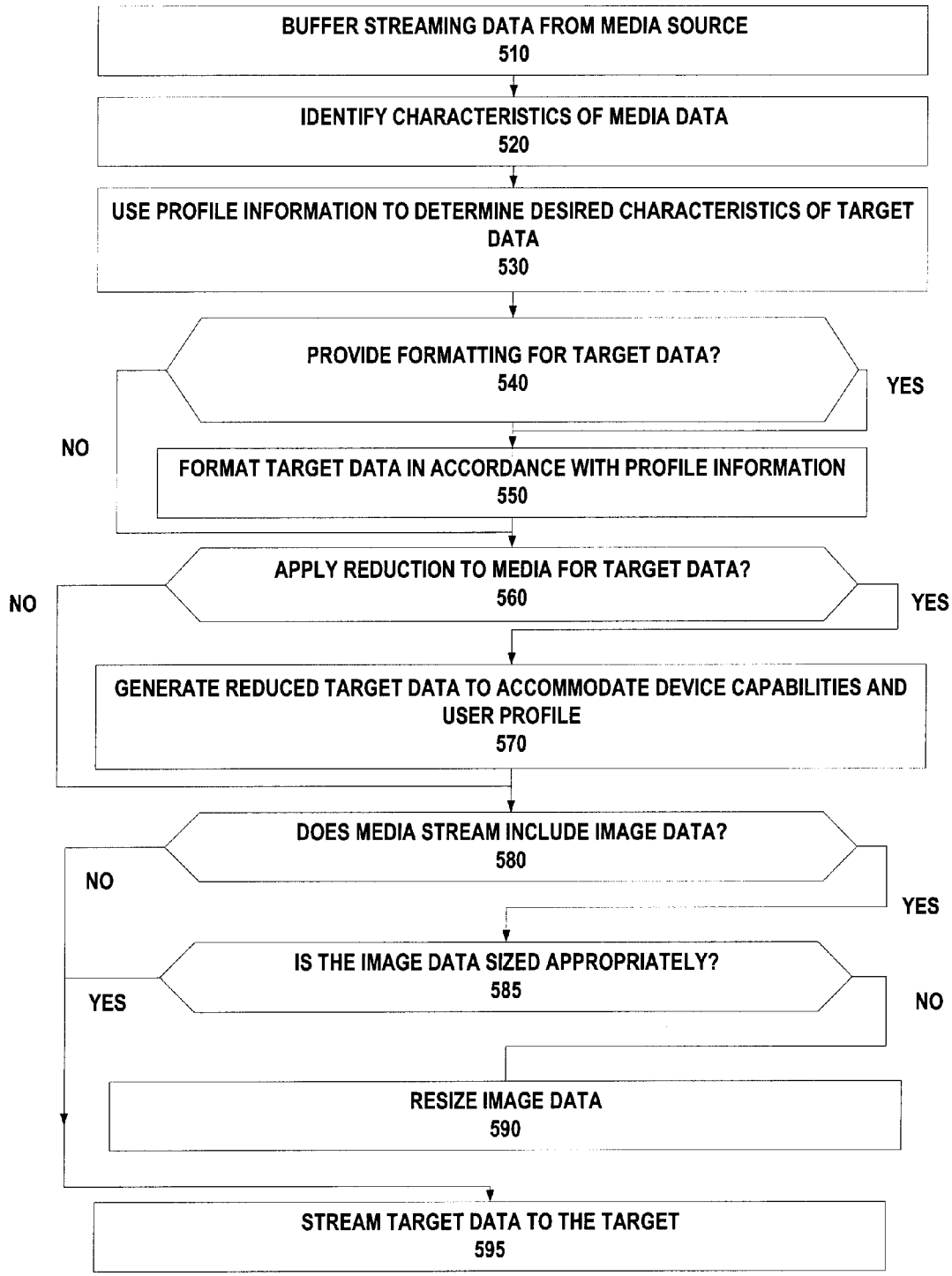
FIG. 5 illustrates a method for re-streaming media streams from external sources to targets, under an embodiment of the invention.

The media delivery system 410 performs the functions of converting and configuring the data in the media streams 475 for transmission to the targets, as described above. The performance of the media delivery system 410 in the context of delivering media corresponding to external streaming media may be described with FIG. 5.

In step 510, streaming media data from the media streams 475 are buffered. While a streaming transmission is being received, step 520 provides that a set of characteristic about the media stream is identified. In an implementation such as shown in FIG. 4, this step may be performed by forwarding streaming data 476 to the determination module 412 while the transmission of the media stream 475 is ongoing.

In step 530, the determination module 412 uses profile information 427 to determine which of the processes of the media delivery system 410 are needed in order to make the streaming data 476 conform to the desired characteristics for the target. Accordingly, in step 540, a determination is made as to whether the data type format of the streaming data 476 is compatible with or in accordance with the desired data type for the particular target.

If the data type of the external streaming data 476 is not a desired data type, the formatting component 416 may be used to convert the media stream 475 from its native format to the desired format in step 550. For example, some media sites may provide streaming media in the form of WMP, while the media player on the target device 420 is a REAL player requiring the data type to be of type RM. In response to determining the WMP format, the formatting component 416 identifies the correct conversion process to reformat the media data. The formatting component 416 may include or have access to a library of conversion processes for changing the data type of the streaming data 476.

Following the determination of step 540, another determination 560 may be made as whether the transmission size is within the range specified in the profile information 427. With streaming media, the transmission size may correspond to a bit rate, which is a product of the frame quality and the frame rate. In a typical application, the media source provides media of high-quality, such as comparable to Compact Disc or DVD playback. Such data may be provided at high bit-rates (e.g. 1.5 MB/second). To accommodate this much data, ESH 470 may include a large buffer that communicates with responsive processing resources to move data from the buffer to the media delivery system 410. However, the target may not be capable of receiving the transmission at the same bit rate. If the determination is that reduction is needed, step 570 may provide for the reducer to reduce the overall bit rate. In one embodiment, the reducer 414 may lower the bit rate by lowering the frame quality or by lowering the frame rate. The profile information 427 may specify as to whether reduction should be performed with a setting of high quality frames and low frame rates, high frame rates and low quality frames, or a setting in between. This setting may be set by user preference, target device capabilities or limitations, and/or communication channel bandwidth or congestion.

Media stream 475 may include audio and/or video. In one embodiment, a determination is made in step 580 as to whether the media stream 475 includes image data, either in the form of still images or video. In one implementation, the determination may be made by the determination module 412 through inspection of streaming data 476. If image data is contained, then profile information 427 may be used to determine in step 585 whether the image data is sized appropriately for a display of the target. This includes determining whether the lines of resolution and display dimensions of target device 420 can accommodate the entire span required by the image data in the media stream 475. If the image data is not sized correctly, the image data in the streaming data 476 may be resized in step 590. The display sizer component 415 may re-size the image data (usually to reduce the dimension or resolution). If no image data is contained in the media stream 475, or if the image data is sized correctly, no action is taken on the image data.

In step 595, the target data is transmitted. In the case where the target data corresponds to media stream 475, the target data 405 is streamed to the target. As described, embodiments of the invention provide that the media delivery system 410 performs its operations on incoming media streams 475 in an on-the-fly or responsive manner. Thus, the determination module 412 may inspect the external media data 476 responsive to the ESH 470 receiving the media stream 475, and the components and processes for performing configurations, conversions and alterations to the external media data may be performed while the original stream is being received. The effect is that the ESH 470 and the media delivery system 410 combine to receive media streams and to "re-stream" the media streams to the targets.

Furthermore, under an embodiment, the reception of the media streams 475 from the external media sources 431, 433 may be performed concurrently while the re-streaming to the targets takes place. Thus, it is possible for the media delivery system 410 to re-stream media stream 475 in near real-time.

As described, the external media sources 431, 433 may correspond to any source of media data that resides outside of the local environment which interconnects ESH 470 and the media delivery system 410. Furthermore, the external media sources 431, 433 may be subject to third-party ownership and/or control. In order to optimize performance, the ESH 470 may connect to the Internet using a high-speed Internet connection (e.g. T1 or DSL).

In one embodiment, ESH 470 buffers and forwards the streaming data 476 to the media delivery system without alteration or change. As implemented with such an embodiment, the properties of streaming data 476 are not relevant to the operation of the ESH 470. Within the media delivery system 410, the determination module 412 may inspect the streaming data 476 to determine the properties of the media stream 475.

Depending on design implementations, embodiments of the invention may provide numerous buffers, cache, or other memory resources that may be used throughout the media delivery system 410 to store processed or to-be processed media data 425 for delivery to the targets. For example, in one scenario, a specific media file may be converted and configured for delivery to the target in a first instance. A copy of the configured or converted media may be stored in cache or other memory so the next request for that media source avoids performance of the processes in the media delivery system 410. Rather, the appropriately converted/configured data may be retrieved from cache. Likewise, while streaming data from external sources may be delivered to the targets concurrently or in near real-time, an embodiment contemplates the streaming data being stored or buffered for delayed transmission to the target. For example, the transmission to the target may be delayed until the user is ready, until the user has adequate network bandwidth, the user is finished taking a phone call or for other reasons.

Transmission to Target

As described herein, the target that receives target data from the media delivery system may be machine, device or network location. In one embodiment, the media delivery system 410 may be implemented to transfer data to any type of target. One type of target for target data provided by the media delivery system 410 is a roaming device. A roaming device may correspond to a device that is network enabled while being mobile, so that is has physical locations and can use different network connections to connect to the Internet. An example of a roaming device is a smart cellular phone, a personal digital assistant with network capabilities (e.g. WIFI or cellular), or a laptop computer that is used with Hot Spots or other locations of Internet connectivity.

Figure 6A:
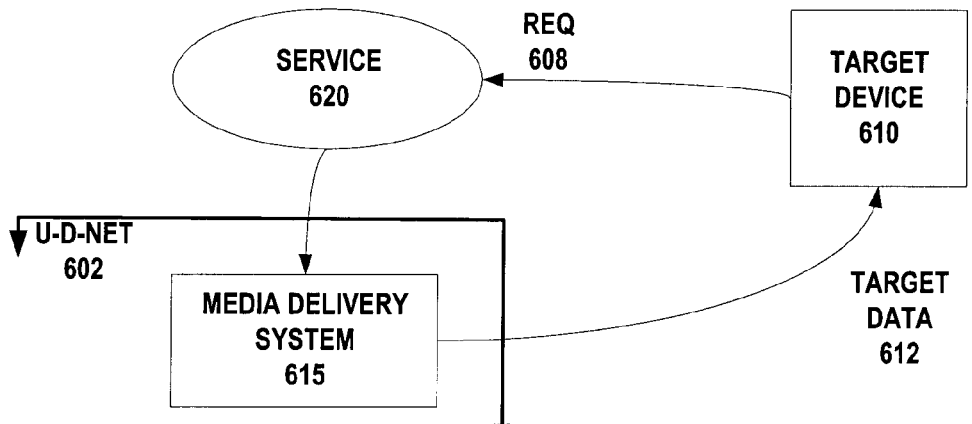
FIGS. 6A-6D illustrate techniques by which target data may be transmitted to a target, under one or more embodiments of the invention.

FIG. 6A illustrates an embodiment for transferring target data 612 directly to a target that is a device 610, such as a roaming device. The target data 612 may generate a request 608 that results in the transmission of the target data 612. In one embodiment, the request 608 is made to a network service 620, which has access to portions of the user-defined network. The network service 620 may have a network location that is accessible to the target device through use of a browser or other web-enabled component. For example, the service 620 may be provided through selectable iconic representation on a GUI of the target device, the selection of which corresponds to the web browser activating a URL to the service. In turn, the service 620 gains access to the user-defined network 602 (or other network enabled system of the user) using a network such as the Internet. In one embodiment, the service 620 communicates the network location of the device 610 to the media delivery system 615 within the user-defined network 602, and the media delivery system within the user's network establishes a peer-to-peer connection with the target. It is over the peer-to-peer connection that target data is transmitted.

In a variation, the service 620 performs functions such as authenticating and/or verifying the user of the roaming device. The service 620 may also determine information about the user's device, such as information about the capabilities of the target device (e.g. what type of browser made the request).

Figure 6B:
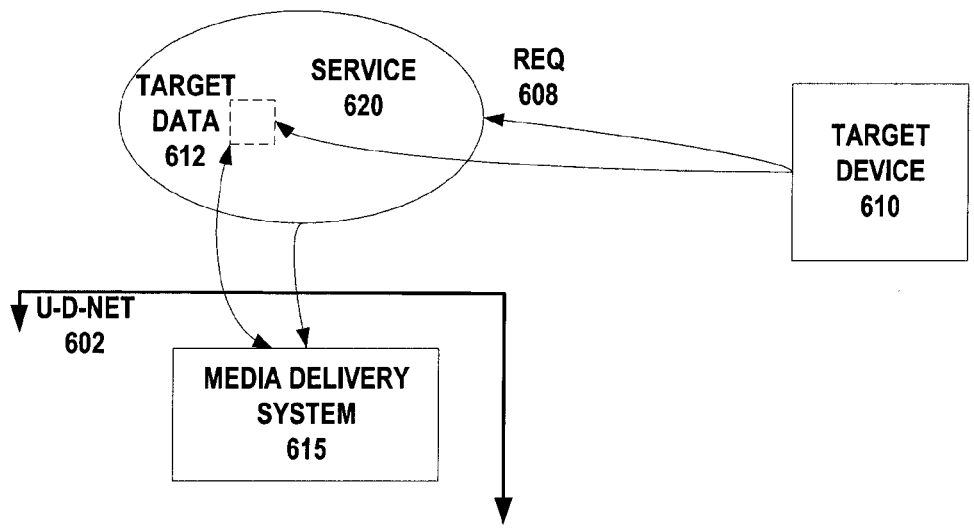

In another variation shown by FIG. 6B, the service 620 acts as an intermediary between the target device 610 and the media delivery system 615. Thus, target data 612 is sent to a target that is a network location hosted by the service 620. At the same time, the target device 620 is directed to access that location to receive the target data.

Figure 6C:
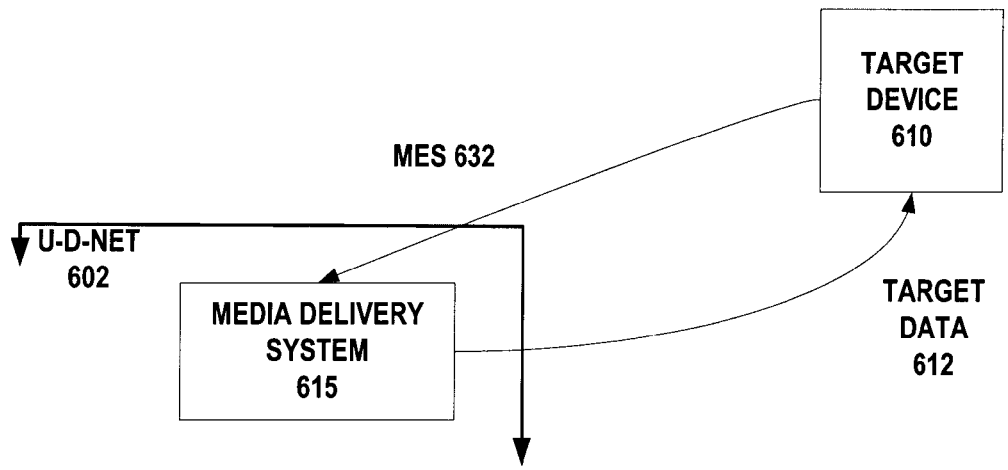

In yet another variation shown by FIG. 6C, rather than use the service 620, the target device and the media delivery system may rely on messaging. For example, the target device 610 may send a message 632 corresponding to the request for target data. The media delivery system may then message (e.g. media file as email attachment) the target data 612 back to the target device. More than one message may be needed to communicate the target data.

Figure 6D:
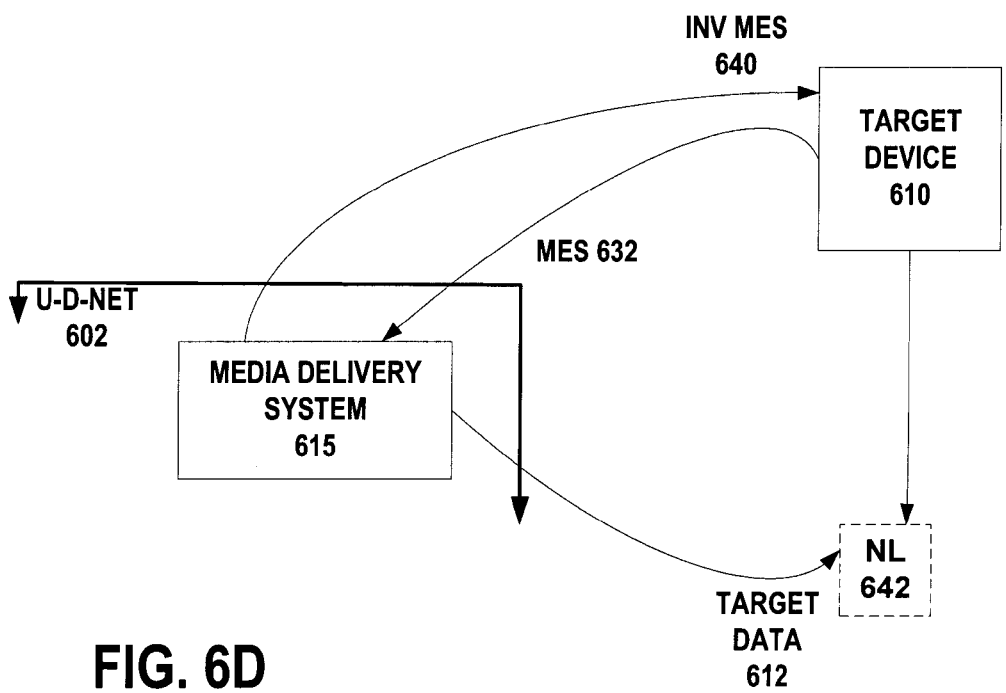

FIG. 6D illustrates an implementation in which the user's defined network 602 and the target device 602 communicate to establish their own network location for which target data is to be relayed. In one implementation, the media delivery system of the user's network sends an invitation message 640, such as in the form of a Short Message Service transmission, communicating the network location for which the browser of the target device 610 is to access. The target data is then transmitted to that network location 642 (which may correspond to the target 420, as shown in FIG. 4). The target device 610 then accesses the network location to receive the target data.

Conclusion

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A computer-implemented system for delivering media content across one or more networks to one or more target devices, the system comprising:

a plurality of devices that interface with a plurality of media sources that are of a different type;

wherein the plurality of devices are individually interconnected to one another to form a personal network;

one or more processors, included with at least one of the plurality of devices, configured to:

enable a user to (i) select one of the plurality of devices to operate, and (ii) to operate the selected device to select a target device;

make each of the plurality of media sources available for selection by the user operating the selected device in the personal network, in order to provide media content to the target device;

in response to receiving a selection input from the user operating the selected device, access an Internet streaming media source selected by the user and generate target data that corresponds to the media content of the Internet streaming media source, wherein the target data is generated to include one or more characteristics that accommodate the target device and which convert or alter data of the media content provided from the Internet streaming media source as compared to a native state for how data is otherwise provided for output of the media content from the Internet streaming media source; and stream the target data to the target device over the one or more networks;

wherein the target device is a roaming device; and wherein the one or more processors are configured to determine one or more native characteristics of the media content provided by the Internet streaming media source, and wherein the one or more processors generate target data to include one or more characteristics by:

determining whether the one or more native characteristics are in conflict with one or more desired characteristics for the target data;

if any of the one or more native characteristics are in conflict with any of the desired characteristics, configuring the target data to include the desired characteristic over the conflicting native characteristic; and if each of the one or more native characteristics are in accord with the one or more desired characteristics, maintaining the one or more native characteristics in the target data.

2. The system of claim 1, wherein the one or more processors are configured to stream the target data with the one or more characteristics concurrently while receiving streaming data from the Internet streaming media source in the native state.

3. The system of claim 1, wherein the one or more processors stream the target data to the roaming device over at least a cellular communication network.

4. The system of claim 3, wherein the one or more processors stream the target data to the roaming device while concurrently receiving streaming data from the Internet streaming media source in the native state.

5. The system of claim 1, wherein the one or more processors are configured to determine the one or more characteristics that are included with the target data by determining one or more physical characteristics or capabilities of the roaming device.

6. The system of claim 5, wherein the one or more processors are configured to determine the one or more physical characteristics or capabilities of the roaming device by accessing a stored profile associated with one or more devices of the user, in order to determine at least one of (i) a display size of the roaming device, or (ii) a data format used by a media player that resides on the roaming device.

7. The system of claim 5, wherein the one or more processors are configured to determine the one or more physical characteristics or capabilities of the roaming device by responsively determining a transmission size for the target data based on a bandwidth characteristic of a network used by the roaming device to communicate with the system.

8. The system of claim 1, wherein the one or more processors are configured to determine the one or more characteristics by programmatically determining a format for the target data based at least in part on a media player type on the device that is operated on the roaming device.

9. The system of claim 1, wherein the one or more processors are configured to determine the one or more characteristics by programmatically determining a transmission size for the target data based at least in part on a data reception capability of the roaming device.

10. The system of claim 1, wherein the one or more processors are configured to generate the target data to be a reduction of data otherwise available from the Internet streaming media source.

11. The system of claim 1, wherein the one or more processors are configured to determine the one or more characteristics by determining a transmission size for the target data based on a data reception capability of the roaming device, including determining the data reception capability based on one or more of (i) a network bandwidth to transmit data to the roaming device, (ii) processing resources of the roaming device to handle the target data, and (iii) memory resources of the roaming device to handle the target data.

12. The system of claim 11, wherein the roaming device is a mobile computing device, and wherein the one or more processors are configured to determine the one or more characteristics by determining the data reception capability of the mobile computing device based on one or more of the (i) network bandwidth of a cellular network used by the mobile computing device, (ii) processing resources of the mobile computing device to handle data from the selected media source, or (iii) memory resources of the mobile computing device to handle data from the selected media source.

13. The system of claim 1, wherein the one or more processors are configured to generate target data to include the one or more characteristics by also identifying profile information corresponding to a screen size of the roaming device, so that the one or more processors stream the target data to include image data that is sized for the screen size of the roaming device.

14. The system of claim 1, wherein the one or more processors are configured to stream the target data by (i) buffering a media stream that is received in response to selecting a media file of the Internet streaming media source, and (ii) transmitting the target data corresponding to the media stream to the roaming device concurrently with buffering the media stream.

15. The system of claim 14, wherein the one or more processors are configured to determine the one or more characteristics for the target data by making a determination from a stored profile as to whether the one or more characteristics of the media stream correspond to one or more desired characteristics for the target data while the media stream is being received by the system.

16. The system of claim 15, wherein the one or more processors are configured to:

determine the one or more characteristics of the media stream by determining a native data format of the media stream; and stream the target data by converting the media stream from the native data format to a desired data format specified by the stored profile.

17. The system of claim 15, wherein the one or more processors are configured to:
determine the one or more characteristics of the media stream by determining a transmission size for streaming the target data to the roaming device; and
stream the target data by reducing the target data when the transmission size is determined for the roaming device to be less than a transmission size of the media stream as received by system.

18. The system of claim 15, wherein the one or more processors are configured to:
determine the one or more characteristics of the media stream by determining a suitable display size of image data in the media data based on a corresponding capability of the roaming device; and
stream the target data to the roaming device to accommodate the display size of the device that is the roaming device.

19. A non-transitory computer-readable medium that stores instructions for delivering media across one or more networks to a target device, wherein the instructions, when executed by one or more processors, cause the one or more processors to perform steps comprising:
enabling a user to operate a first device in order to select a media source and the target device on which to receive a media stream from the media source, the target device being interconnected to the first device over a wireless or network connection;
wherein the first device and the target device comprise at least a portion of a personal network that is under control of the user;
analyzing the media stream to determine one or more native characteristics of the media stream;
accessing profile information associated with the target device to determine one or more desired characteristics for target data that is to be transmitted to the target device;
generating the target data to correspond to the media stream and to include the one or more desired characteristics, wherein if any of the one or more native characteristics are in conflict with a given characteristic of the one or more desired characteristics, generating the target data includes performing one or more processes on the media stream to generate the target data with the given desired characteristic and not the conflicting native characteristic; and
transmitting the target data to the target device using the wireless or network connection;
wherein the target device is a mobile computing device, and wherein the step of transmitting the target data to the target device includes causing the target data to be transmitted to the mobile computing device over one or more networks that includes a cellular data network;
wherein the step of analyzing the media stream includes determining a data format of the media stream, and wherein the step of generating the target data includes generating the streamed target data to have a data format specified by the profile information, and wherein the instructions provide that if the data format specified by the profile information is incompatible with the data format of the media stream, then the one or more processors perform the step of performing one or more conversion processes to convert the media stream to the data format specified by the profile information.

20. The computer-readable medium of claim 19, further comprising instructions for performing the steps of receiving and buffering the media stream, and wherein the step of transmitting the target data to the target device includes streaming the target data with the one or more desired characteristics concurrently while buffering the media stream.

21. The computer-readable medium of claim 19, wherein the step of transmitting the target data to the target device includes streaming the target data to the target device.

22. The computer-readable medium of claim 19, further comprising instructions for performing the step of receiving the media stream from a website.

23. The computer-readable medium of claim 19, further comprising instructions for performing the step of receiving the media stream includes streaming media source data from one or more sources selected from a group consisting of: (i) a website that provides streaming media files or channels, (ii) a cable television feed, and (iii) a satellite media feed.

24. The computer-readable medium of claim 19, further comprising instructions for performing the step of receiving and buffering the media stream, and wherein the step of analyzing the media stream is performed concurrently while the media stream is being buffered.

25. The computer-readable medium of claim 24, wherein the step of analyzing the media stream includes determining a transmission size of the media stream, and wherein the step of generating the target data includes streaming the target data with a transmission size that is specified by the profile information.

26. The computer-readable medium of claim 19, wherein the step of generating the target data includes performing one or more operations to replace or alter the one or more native characteristics with the one or more desired characteristics selected from a group consisting of (i) a data format, (ii) a transmission size, and (iii) an image data display size.

27. A system for providing media to one or more target devices, the system comprising:
an interface that is operable on a given device to enable a user to select and receive, for playback, a plurality of media sources of different types from a plurality of different locations that are accessible over one or more networks;
a stream handling module configured to receive or acquire a media stream or file from a media source selected by the user through the interface;
a media delivery system that is configured to transmit target data corresponding to the media stream or file received or acquired from the selected media source to a designated target device, wherein the media delivery system is configured to format at least some of the target data for the target device in transmitting the target data to the target device; and
wherein the interface, the stream handling module, the media delivery system and the target device comprise a personal network of the user;
wherein the media delivery system includes a determination module that (i) identifies one or more native characteristics of the media stream or file, and (ii) if any of the one or more native characteristics are in conflict with a desired characteristic of the target data, identifies or performs one or more processes in order to include the desired characteristic and not the conflicting native characteristic;
wherein the media delivery system includes a formatting component that performs a process of configuring the target data to have a data type specified for the target device in response to the determination module determining that a native data format of the media stream is incompatible with the data type specified or desired for the target device.

28. The system of claim 27, wherein the stream handling module includes a buffer that buffers the media stream, and wherein the media delivery system transmits the target data to the target device concurrently with the buffer receiving the media stream from the one or more media sources.

29. The system of claim 27, wherein the media delivery system streams the target data to the target device.

30. A system for providing media to one or more target devices, the system comprising:
an interface that is operable on a given device to enable a user to select and receive, for playback, a plurality of media sources of different types from a plurality of different locations that are accessible over one or more networks;
a stream handling module configured to receive or acquire a media stream or file from a media source selected by the user through the interface;
a media delivery system that is configured to transmit target data corresponding to the media stream or file received or acquired from the selected media source to a designated target device, wherein the media delivery system is configured to format at least some of the target data for the target device in transmitting the target data to the target device; and
wherein the interface, the stream handling module, the media delivery system and the target device comprise a personal network of the user;
wherein the media delivery system includes a determination module that (i) identifies one or more native characteristics of the media stream or file, and (ii) if any of the one or more native characteristics are in conflict with a desired characteristic of the target data, identifies or performs one or more processes in order to include the desired characteristic and not the conflicting native characteristic;
wherein the media delivery system includes a reducer component that performs a process of configuring a transmission size of the target data to be less than a transmission size of the media stream, in response to the determination module determining that a reduction in the transmission size is desired to accommodate the target device.

31. The system of claim 30, wherein the stream handling module includes a buffer that buffers the media stream, and wherein the media delivery system transmits the target data to the target device concurrently with the buffer receiving the media stream from the one or more media sources.

32. The system of claim 30, wherein the media delivery system streams the target data to the target device.

33. A system for providing media to one or more target devices, the system comprising:
an interface that is operable on a given device to enable a user to select and receive, for playback, a plurality of media sources of different types from a plurality of different locations that are accessible over one or more networks;
a stream handling module configured to receive or acquire a media stream or file from a media source selected by the user through the interface;
a media delivery system that is configured to transmit target data corresponding to the media stream or file received or acquired from the selected media source to a designated target device, wherein the media delivery system is configured to format at least some of the target data for the target device in transmitting the target data to the target device; and
wherein the interface, the stream handling module, the media delivery system and the target device comprise a personal network of the user;
wherein the media delivery system includes a determination module that (i) identifies one or more native characteristics of the media stream or file, and (ii) if any of the one or more native characteristics are in conflict with a desired characteristic of the target data, identifies or performs one or more processes in order to include the desired characteristic and not the conflicting native characteristic;
wherein the media delivery system includes a sizer component that performs a process of configuring image data identified from the media stream to be of a particular dimension or resolution, in response to the determination module determining that image data in the media stream needs to be re-sized.

34. The system of claim 33, wherein the stream handling module includes a buffer that buffers the media stream, and wherein the media delivery system transmits the target data to the target device concurrently with the buffer receiving the media stream from the one or more media sources.

35. The system of claim 33, wherein the media delivery system streams the target data to the target device.

36. A system for providing media to one or more target devices, the system comprising:
an interface that is operable on a given device to enable a user to select and receive, for playback, a plurality of media sources of different types from a plurality of different locations that are accessible over one or more networks;
a stream handling module configured to receive or acquire a media stream or file from a media source selected by the user through the interface;
a media delivery system that is configured to transmit target data corresponding to the media stream or file received or acquired from the selected media source to a designated target device, wherein the media delivery system is configured to format at least some of the target data for the target device in transmitting the target data to the target device; and
wherein the interface, the stream handling module, the media delivery system and the target device comprise a personal network of the user;
wherein the media delivery system includes a determination module that (i) identifies one or more native characteristics of the media stream or file, and (ii) if any of the one or more native characteristics are in conflict with a desired characteristic of the target data, identifies or performs one or more processes in order to include the desired characteristic and not the conflicting native characteristic;
wherein the media delivery system is configured to stream the target data to the target device, so that the target data generated from a portion of a given media stream is streamed to the target device while another portion of the given media stream is received by the stream handling module.

37. The system of claim 36, wherein the stream handling module includes a buffer that buffers the media stream, and wherein the media delivery system transmits the target data to the target device concurrently with the buffer receiving the media stream from the one or more media sources.

38. The system of claim 36, wherein the media delivery system streams the target data to the target device.

39. A computer-implemented system for delivering media content across one or more networks to one or more target devices, the system comprising:
- a plurality of devices that interface with a plurality of media sources that are of a different type;
- wherein the plurality of devices are individually interconnected to one another to form a personal network;
- one or more processors, included with at least one of the plurality of devices, configured to:
  - enable a user to select one of the plurality of devices to operate, and to operate the selected device to select a target device;
  - make each of the plurality of media sources available for selection by the user operating the selected device in the personal network, in order to provide media content to the target device;
  - in response to receiving a selection input from the user operating the selected device, access a selected media source and generate target data that corresponds to the media content of the selected media source, wherein the target data is generated to include one or more characteristics that accommodate the target device and which convert or alter data from the selected media source as compared to one or more native characteristics of data that is otherwise provided for output of media content from the selected media source; and
  - stream the target data to the target device over the one or more networks
  - wherein in response to receiving selection input corresponding to selection of an Internet streaming media source, the one or more processors determine the one or more native characteristics of the media content of the Internet streaming media source by using one or more links to access a corresponding media file or stream of the Internet streaming media source, and by receiving streaming media using the one or more links.

40. The system of claim 39, wherein the one or more processors are configured to determine the one or more characteristics by programmatically determining a format for the target data based at least in part on a media player type on the device that is operated on the target device.

41. The system of claim 39, wherein the one or more processors are configured to determine the one or more characteristics by programmatically determining a transmission size for the target data based at least in part on a data reception capability of the target device.

42. The system of claim 39, wherein the one or more processors are configured to generate the target data to be a reduction of data otherwise available from the media Internet streaming source.

43. The system of claim 39, wherein the one or more processors are configured to determine the one or more characteristics by determining a transmission size for the target data based on a data reception capability of the target device, including determining the data reception capability based on one or more of (i) a network bandwidth to transmit data to the target device, (ii) processing resources of the target device to handle the target data, and (iii) memory resources of the target device to handle the target data.

44. The system of claim 43, wherein the target device is a mobile computing device, and wherein the one or more processors are configured to determine the one or more characteristics by determining the data reception capability of the mobile computing device based on one or more of the (i) network bandwidth of a cellular network used by the mobile computing device, (ii) processing resources of the mobile computing device to handle data from the selected media source, or (iii) memory resources of the mobile computing device to handle data from the selected media source.

45. A method for delivering media across one or more networks to a target device, the method comprising:
- enabling a user to operate a first device in order to select a media source and the target device on which to receive a media stream from the media source, the target device being interconnected to the first device over a wireless or network connection;
- wherein the first device and the target device comprise at least a portion of a personal network that is under control of the user;
- analyzing the media stream to determine one or more native characteristics of the media stream;
- accessing profile information associated with the target device to determine one or more desired characteristics for target data that is to be transmitted to the target device;
- generating the target data to correspond to the media stream and to include the one or more desired characteristics, wherein if any of the one or more native characteristics are in conflict with a given characteristic of the one or more desired characteristics, generating the target data includes performing one or more processes on the media stream to generate the target data with the given desired characteristic and not the conflicting native characteristic; and
- transmitting the target data to the target device using the wireless or network connection;
- wherein the target device is a mobile computing device, and wherein the step of transmitting the target data to the target device includes causing the target data to be transmitted to the mobile computing device over one or more networks that includes a cellular data network;
- wherein the step of analyzing the media stream includes determining a data format of the media stream, and
- wherein the step of generating the target data includes generating the streamed target data to have a data format specified by the profile information, including performing one or more conversion processes to convert the media stream to the data format specified by the profile information in response to the data format specified by the profile information being incompatible with the data format of the media stream.

46. The method of claim 45, further comprising receiving the media stream and buffering the media stream, and wherein the step of transmitting the target data to the target device includes streaming the target data with the one or more desired characteristics concurrently while buffering the media stream.

47. The method of claim 45, wherein the step of transmitting the target data to the target device includes streaming the target data to the target device.

48. The method of claim 45, wherein the step of receiving a media stream includes receiving the media stream from a website.

49. The method of claim 45, further comprising the step of receiving the media stream from one or more sources selected from a group consisting of: (i) a website that provides streaming media files or channels, (ii) a cable television feed, and (iii) a satellite media feed.

50. The method of claim 45, further comprising the steps of receiving the media stream and buffering the media stream, and wherein the step of analyzing the media stream is performed concurrently while the media stream is being buffered.

51. The method of claim 50, wherein the step of analyzing the media stream includes determining a transmission size of the media stream, and wherein the step of generating the target data includes streaming the target data with a transmission size that is specified by the profile information.

52. The method of claim 45, wherein the step of generating the target data includes performing one or more operations to replace or alter the one or more native characteristics with the one or more desired characteristics selected from a group consisting of (i) a data format, (ii) a transmission size, and (iii) an image data display size.

* * * * *